(12) United States Patent
Watanabe

(10) Patent No.: US 7,242,432 B2
(45) Date of Patent: Jul. 10, 2007

(54) IMAGING APPARATUS SUPPRESSING AN OCCURRENCE OF COLOR MOIRE

(75) Inventor: Nobuyuki Watanabe, Yokohama (JP)

(73) Assignee: Olympus Corporation, Tokyo (JP)

( * ) Notice: Subject to any disclaimer, the term of this patent is extended or adjusted under 35 U.S.C. 154(b) by 853 days.

(21) Appl. No.: 10/440,203

(22) Filed: May 16, 2003

(65) Prior Publication Data

US 2003/0227552 A1    Dec. 11, 2003

(30) Foreign Application Priority Data

May 22, 2002  (JP)  ............................. 2002-147136

(51) Int. Cl.
*H04N 5/222* (2006.01)
(52) U.S. Cl. ................... 348/333.11; 348/280
(58) Field of Classification Search ................ 348/241, 348/242, 273, 280, 281, 333.11, 333.12; 358/533
See application file for complete search history.

(56) References Cited

U.S. PATENT DOCUMENTS

| | | | | |
|---|---|---|---|---|
| 5,493,335 A * | 2/1996 | Parulski et al. | ............. | 348/273 |
| 5,949,483 A * | 9/1999 | Fossum et al. | ............. | 348/303 |
| 6,122,007 A * | 9/2000 | Ishibashi | ................ | 348/231.6 |
| 6,133,954 A * | 10/2000 | Jie et al. | ..................... | 348/281 |
| 6,204,879 B1 * | 3/2001 | Koseki et al. | ........... | 348/230.1 |
| 6,686,960 B2 * | 2/2004 | Iizuka | ........................ | 348/273 |
| 7,174,053 B2 * | 2/2007 | Onuki et al. | ........... | 348/333.05 |
| 2001/0012063 A1 * | 8/2001 | Maeda | ....................... | 348/222 |
| 2002/0001031 A1 * | 1/2002 | Kanesaka | .................... | 348/101 |
| 2003/0088560 A1 * | 5/2003 | Ejima et al. | .................... | 707/3 |
| 2005/0237409 A1 * | 10/2005 | Hamasaki | ................... | 348/311 |

FOREIGN PATENT DOCUMENTS

| JP | 6217201 | 5/1994 |
|---|---|---|
| JP | 9247689 | 9/1997 |

OTHER PUBLICATIONS

Video Moiré Cancellation Filter For High-Resolution CRTs, IEEE Transactions on Consumer Electronics vol. 47, No. 1, Feb. 2001, pp. 17-24.

* cited by examiner

*Primary Examiner*—Vivek Srivastava
*Assistant Examiner*—Jason Whipkey
(74) *Attorney, Agent, or Firm*—Volpe & Koenig PC

(57) ABSTRACT

An imaging apparatus for outputting image signals by photoelectrically converting an image formed at an optical system by an image sensor array having a color filter array having several spectral transmittance disposed in front thereof, including: mode setting means capable of setting at least one mode among an all-pixel read mode for effecting readout of all the pixels of at least one horizontal line, an intermittent read mode for effecting readout in a thinned-out manner of pixels to be read out from at least one horizontal line, and an averaging read mode for effecting readout by averaging a plurality of pixels as the mode for reading out image signals from the image sensor array; and readout rule control means for controlling and determining pixel locations for reading out the image signals: when the intermittent read mode and/or the averaging read mode have been set by the mode setting means, the readout pixel locations to be determined by the readout rule control means are caused to vary frame by frame in the image signals to be read out.

12 Claims, 25 Drawing Sheets

FIG. 18A

ODD FRAME

FIG. 18B

EVEN FRAME

FIG. 19A

ODD FRAME

FIG. 19B

EVEN FRAME

ODD FRAME

EVEN FRAME

FIG. 22A

ODD FRAME

FIG. 22B

ODD FRAME

FIG. 22C

EVEN FRAME

FIG. 22D

EVEN FRAME

IMAGING APPARATUS SUPPRESSING AN OCCURRENCE OF COLOR MOIRE

This application claims benefit of Japanese Patent Application No. 2002-147136 filed in Japan on May 22, 2002, the contents of which are incorporated by this reference.

BACKGROUND OF THE INVENTION

The present invention relates to imaging apparatus, and more particularly relates to high-definition electronic still imaging apparatus having a liquid crystal view finder and also to imaging apparatus capable of both movie taking and high-definition still image taking.

Because of the rapid spreading of personal computers in recent years, there is an increasing demand for digital cameras (electronic still camera) as an image input equipment. Also, high-quality image recording apparatus such as digital camcorder are widely used as a recording equipment of movies. Among the several factors by which an image quality of the above described electronic still camera is determined, the number of pixels of image sensor is a major factor for determining the resolution of taken image. For this reason, even the electronic still camera of some types having a large pixel number of 4,000,000 or more are sold in the recent market.

The original purpose of the digital camera (electronic still camera) is to take still images, and it is provided with either a conventional optical finder or an electronic view finder (EVF) as the finder for confirming the extent of object to be photographed in a similar manner as the finder of the film camera. The optical finders generally have higher image quality as compared to the EVFs.

The optical finders, however, cannot follow optical zoom at a high magnification of the order of 4 to 10, and it is a general technique to use an EVF. An EVF has the resolution that is 1/10 to 1/60 of that of the image sensor of an imaging apparatus (ex. An EVF has quarter VGA: 75,000 pixels and image sensor has 3.2 M pixels. The ratio is 1/42). Considering the operation clock of pixels, it is generally difficult for an image sensor having several-million pixels to take 30 frames per second as at NTSC rate (For Example 5 M pixel picture is limited to take 8 frames per second for a pixel clock of 40 MHz. However this is the theoretical upper limit. In actual case frame number is less than 8). For this reason, a displaying based on readout of all the pixels of the image sensor having several million pixels is very difficult or costly, and only the pixels of a number required for a displaying at EVF are read out (thinned-out readout or averaging readout) so as to effect a real-time display.

Here, since the purpose of an EVF is to allow a real-time check of the situation and composition of the object, it must provide the user with a quality image. Further, there are many types of digital camera that are sold in the market as having, in addition to the view finder, a function capable also of taking movies. Conversely, a function capable of taking high-definition still images is provided also in digital camcorders. In the former case, due to the standard of image that can be recorded, an image sensor having a several-million pixels is used and the image size is reduced to VGA (about 300,000 pixels), QVGA (about 75,000 pixels) so as to effect the standard data compression based on JPEG, MPEG, etc. From the user's viewpoint, this is a result of the natural wants for freedom from the annoying situation where one has to act with having a plural type of digital camera or digital camcorder.

Because of the demands as described, the displaying/recording of a low-resolution but high-quality image is required even in those imaging apparatus having a high-resolution characteristic. Generally, lack of resolution is known to cause moire due to folding of a texture having a higher frequency than the sampling frequency. Therefore, in a known effective method for suppressing moire, all pixels of a high-resolution image are read out and is averaged in a certain area by a low-pass filter, and followed by reducing image size to a low-resolution image so that the moire is made less conspicuous by restraining band of the low-resolution image.

However, it is difficult to read all of the pixels to obtain a high-quality movie because of limitations on the frame rate of movies and on the operation clock of an image sensor as described above.

Among averaging read methods of a CCD image sensor is a method in which current values are accumulated and read out so as to increase the operation time for readout. In using this method, however, there is a problem that an occurrence of capacity overflow of transfer area causes a degradation of signals. Further, as a method of solving such a problem of addition mode readout in CCD image sensor, Japanese patent application laid-open Hei-6-217201 discloses an averaging of voltage readouts by a capacitor device of CMOS image sensor. Furthermore, a suggestion is made in Japanese patent application laid-open Hei-8-52904 where switching of averaging and thinned-out sampling is made between movie and still images, showing an advantage of improved read speed.

SUMMARY OF THE INVENTION

It is a first object of the present invention to provide an imaging apparatus in which an occurrence of spurious signals is prevented even when movie is read out at a standard frame rate (NTSC rate) from a high-resolution image sensor. Further it is a second object of the invention to provide an imaging apparatus in which an occurrence of color moire is suppressed at a single imager of color filter array (CFA) system which is used for the purpose of cost-cutting/compacting.

In a first aspect of the imaging apparatus according to the invention, there is provided an imaging apparatus for outputting image signals by photoelectrically converting an image formed at an optical system by an image sensor array having a color filter array (CFA) having several spectral transmittance disposed in front thereof, including: mode setting means capable of setting at least one mode among an all-pixel read mode for effecting readout of all the pixels of at least one horizontal line, an intermittent read mode for effecting readout in a thinned-out manner of pixels to be read out from at least one horizontal line, and an averaging read mode for effecting readout by averaging a plurality of pixels as the mode for reading out image signals from the image sensor array; and readout rule control means for controlling and determining pixel locations for reading out the image signals. When the intermittent read mode and/or the averaging read mode have been set by the mode setting means, the readout pixel locations to be determined by the readout rule control means are caused to vary frame by frame in the image signals to be read out.

The technical contents corresponding to the first aspect are shown in FIGS. 1, 7, 17, 21, and 25 to 28. In thus constructed imaging apparatus, it is possible to reduce moire even when a size-reduced image is read out at a relatively high frame rate from a high-resolution image sensor array, since the readout pixel locations (readout rule) are caused to be different between consecutive frames. Further, in performing correlation operation between consecutive frames, since it is possible in some cases to obtain more information with varying the readout pixel locations, it becomes possible to mutually interpolate information between frames when the number of sampling pixels in one frame is limited by pixel clock and frame rate.

In a second aspect of the invention, when the intermittent read mode is set by the mode setting means in the imaging apparatus according to the first aspect: the readout pixel locations to be determined by the readout rule control means are composed of pixel locations within a plurality of predetermined regions each consisting of a plurality of adjoining pixels; the plurality of regions are discrete from each other and are arranged in the horizontal and vertical directions of the image sensor array; and the readout rule control means changes and controls the respective locations of the plurality of regions frame by frame in the image signals to be read out.

The technical contents corresponding to the second aspect are shown in FIGS. 7, 17, 21, and 25 to 28. In thus constructed imaging apparatus, the sampling number can be reduced by the discrete arrangement of the plurality of readout pixel location regions from each other and the lack of image information due to the reduced sampling number can be interpolated by interframe that the readout pixel locations are varied frame by frame. It is also possible to achieve a higher frame rate by reducing the sampling number.

In a third aspect of the invention, the readout pixel location regions in the imaging apparatus according to the second aspect are arranged in such a manner that the regions located next to each other in the vertical direction of the image sensor array are shifted horizontally with respect to each other, and the readout rule control means changes the locations of the readout pixel location regions frame by frame.

The technical contents corresponding to the third aspect are shown in FIG. 12. In thus constructed imaging apparatus, it is possible in readout of the image sensor array to reduce moire in specific direction, since location of the sampling is shifted in addition to the horizontal shift. It is further possible to make the moire even less conspicuous by changing the readout pixel locations frame by frame to modulate phase of the moire.

In a fourth aspect of the invention, the imaging apparatus according to the second aspect further includes a filter means for performing filter operation processing of readout image signals to compensate for shift amount resulting from the frame-by-frame change of the locations of the readout pixel location regions.

The technical contents corresponding to the fourth aspect are shown in FIGS. 11A to 11D. In thus constructed imaging apparatus, the shift amount resulting from the frame-by-frame change of the pixel location regions is compensated for by the filter means so that displacement (blur) of image can be reduced at the same time of also reducing color moire and luminance moire.

In a fifth aspect of the invention, the readout pixel location regions in the imaging apparatus according to the second aspect are each in a parallelogram shape where the locations of pixels in the vertical direction of the region are horizontally shifted with respect to each other.

The technical contents corresponding to the fifth aspect are shown in FIGS. 13A to 13E. In thus constructed imaging apparatus, since the readout pixel location regions each are formed into a parallelogram, moire in the horizontal direction thereof can be reduced as compared to the case of being formed into a rectangle.

In a sixth aspect of the invention, the readout pixel location regions in the imaging apparatus according to the second aspect are a combination of parallelogram shape where the locations of pixels in the vertical direction of the region are horizontally shifted with respect to each other and rectangular shape where the locations of pixels in the vertical direction of the region are not shifted from each other.

The technical contents corresponding to the sixth aspect are shown in FIGS. 13B, 13D. In thus constructed imaging apparatus, the plurality of readout pixel location regions within an image frame can be changed region by region as a combination of parallelogram shape and rectangular shape, whereby the cut-off frequency of sampling is made indistinct so that it becomes possible to reduce moire in specific direction.

In a seventh aspect of the invention, the readout rule control means in the imaging apparatus according to the sixth aspect selectively switches the shape of the regions to parallelogram shape or rectangular shape in accordance with the location of the regions frame by frame in the image signals to be read out.

The technical contents corresponding to the seventh aspect are shown in FIGS. 13B, 13D. In thus constructed imaging apparatus, the shape of the readout pixel location regions is formed into a combination of rectangle and parallelogram so that moire of specific frequency and direction is reduced by varying band of sampling region by region, and at the same time the shape of the readout pixel location regions is selectively switched frame by frame so that moire at specific frequency and in specific direction can be further reduced.

In an eighth aspect of the invention, the readout pixel location regions in the imaging apparatus according to the second aspect are formed of a combination of two types of parallelogram shape both having the locations of pixels in the vertical direction of the region that are horizontally shifted and each having a different inclination to the horizontal direction from the other, and the readout rule control means selectively and alternately switches frame by frame in the image signals to be read out the shape of the regions to one or the other of the two types of parallelogram having different shape in accordance with the location of the regions.

The technical contents corresponding to the eighth aspect are shown in FIGS. 13C, 13E. In thus constructed imaging apparatus, the shape of the readout pixel location regions is formed into a combination of two types of parallelogram so that moire at specific frequency and in specific direction can be reduced by varying band of sampling region by region, and the shape of the regions is selectively switched frame by frame so that moire at specific frequency and in specific direction can be further reduced.

In a ninth aspect of the invention, the imaging apparatus according to the first aspect further includes an averaging means for performing a predetermined averaging operation on readout image signals when the intermittent read mode has been set by the mode setting means.

The technical contents corresponding to the ninth aspect are shown in FIGS. 2, 3, 14A, 14B. In thus constructed imaging apparatus, band limitation can be effected by the performance of an averaging operation at the averaging means to reduce color moire and luminance moire. Further, since sampling of a plurality of pixels can be performed by one clock by means of averaging, the speed thereof can be increased.

In a tenth aspect of the invention, of the imaging apparatus according to the ninth aspect, those regions subjected to the averaging operation by the averaging means and those regions not subjected to the averaging operation are caused to alternately occur on the image sensor array.

The technical contents corresponding to the tenth aspect are shown in FIGS. 14A, 14B. In thus constructed imaging apparatus, color moire can be reduced without reducing the resolution of image as a whole by computing chromatic component from the regions at which the averaging is performed and by computing luminance information from the regions at which the averaging is not performed. Further, it becomes possible to reduce moire at specific frequency by varying the sampling frequency and phase region by region.

In an eleventh aspect of the invention, of the imaging apparatus according to the tenth aspect, the regions subjected to the averaging operation and the regions not subjected to the averaging operation are switched to each other frame by frame in the image signals to be read out.

The technical contents corresponding to the eleventh aspect are shown in FIGS. 14A, 14B. In thus constructed imaging apparatus, since sampling mode (rule) is varied region by region and in addition the sampling modes are exchanged frame by frame, the frequency and phase of sampling can be varied to visually reduce color moire and luminance moire.

In a twelfth aspect of the invention, the imaging apparatus according to the first aspect further includes a means for extracting color signals from the signals obtained by averaging image signals corresponding to the same block location within consecutive frames read out at the time of the all-pixel read mode and extracting luminescence signals from the signals read out at the time of the intermittent read mode to generate consecutive image data by composing the respectively extracted color signals and luminescence signals.

The technical contents corresponding to the twelfth aspect are shown in FIGS. 17 to 22D. In thus constructed imaging apparatus, an image having less color moire and luminance moire can be generated by a limited sampling number by interpolating image information between frames, since luminescence signals from the intermittent readout signals and color signals from the averaged signals in the consecutive frames are separately sampled and then composed.

It should be noted that the extracting technique of luminescence signal in the twelfth aspect includes the technique in which the respective color signals of RGB in image signals are read out in a thinned-out manner and then averaged to form a luminescence signal (corresponding to FIGS. 18, 19), and the technique in which G signals are read out as a block average and then averaged to form a luminescence signal (corresponding to FIG. 22).

In a thirteenth aspect of the invention, the imaging apparatus according to the twelfth aspect further includes: a means for detecting difference of luminance information between frames of the image signals to be read out and a means for switching the interpolating method of luminance information and chromatic component based on the difference between the frames detected at the difference detecting means.

The technical contents corresponding to the thirteenth aspect are shown in FIGS. 22A to 28. In thus constructed imaging apparatus, the difference detecting means of luminance information between frames is provided so that inter-frame interpolation can be stopped and switching be made to an intra-frame interpolation in those images having relatively small correlation between frames. It is thus possible to reduce flicker of image in the case where Y/C composition in consecutive frames is performed.

BRIEF DESCRIPTION OF THE DRAWINGS

FIGS. 18A and 18B show the manner of increasing the sampling speed by performing intermittent read in the vertical direction in the read method in the second embodiment shown in FIGS. 14A and 14B.

FIGS. 19A and 19B show the sampling method of Y/C separation and composition in a third embodiment of the invention.

FIGS. 22A to 22D show the manner of the horizontal shift and the horizontal and vertical shift in the sampling method of Y/C separation/composition shown in FIG. 21.

DESCRIPTION OF THE PREFERRED EMBODIMENTS

Some embodiments of the present invention will now be described. Prior to the description of the embodiments, the operation principle of the invention will first be described. In imaging apparatus for movies (camcorders), interlaced scanning systems have conventionally been used to increase operation speed. These are the systems to display by alternately changing pixel locations to be read between ODD and EVEN frames, and the NTSC system rate is considered to provide an indication with few artifact for the observer.

Further, in the so-called wobbling system, the burden of the observer can be reduced by adjusting the pitch of wobbling and operation frequency by a method of shifting display location frame by frame in the display apparatus (IEEE Trans. on Consumer Electronics 47 [1] February 2001, p 16-24). In a system of phase shift, moire due to folding is reduced in theory by performing a sampling beyond the spatial frequency inherent to CCD by shifting the pixels of the CCD based on a mechanical method. In taking/observation of movies, if setting within a range where flicker is not conspicuous to the observer is used, imaging location or display location may be shifted frame by frame and, if so, color moire on the contrary becomes less conspicuous. The present invention is partially based on such operation principles of interlace scan and wobbling.

Further, in reduction sampling, readout of the pixels for producing a full-color data representing a designated block requires the presence of all the colors of RGB or CMY color filter array (CFA) system. Since G channels are more frequent in Bayer matrix CFA generally used, it suffices to use a set of data such as RGB+G, or CMY+G in the complementary-color CFA. Since, as described above, folding of band resulting from regular sampling causes color moire to occur, it is effective to change the manner of sampling with respect to time and space.

Figure 1:
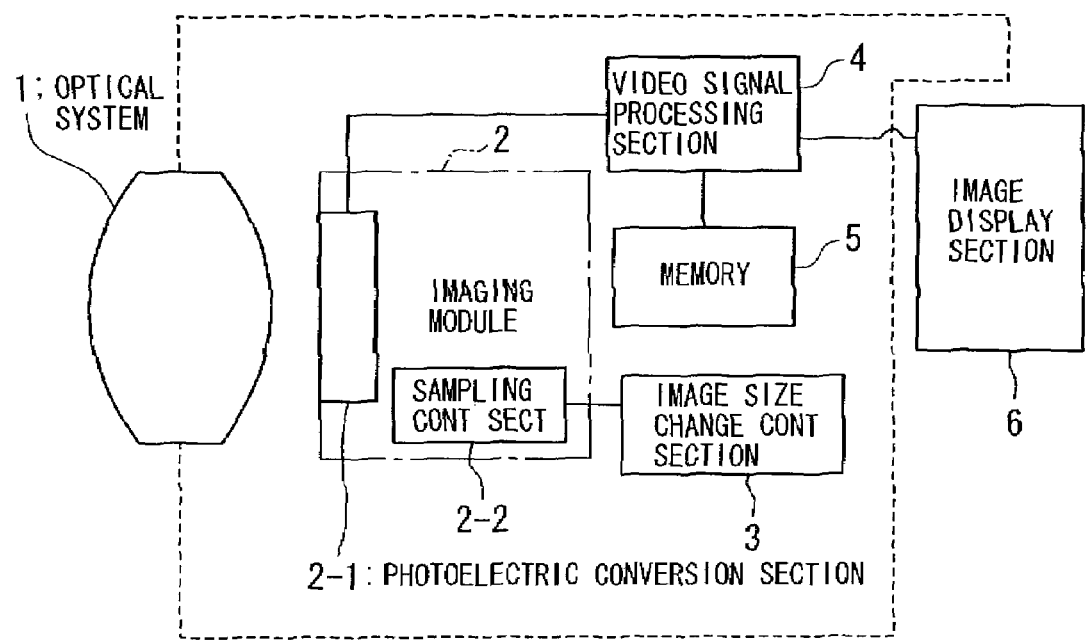
FIG. 1 is a block diagram schematically showing construction of the imaging apparatus according to the invention.

An embodiment will now be described. FIG. 1 is a block diagram schematically showing an embodiment of the imaging apparatus as a whole according to the invention. Referring to FIG. 1, an optical system 1 forms an image of object (not shown) onto a photoelectric conversion section 2-1 such as of CMOS sensor of an imaging module 2. A color filter array (CFA) is disposed in front of photoelectric conversion section 2-1. The operation of the photoelectric conversion section 2-1 is controlled by a sampling control section 2-2. The output signals of the photoelectric conversion section 2-1 are processed by a video signal processing section 4 and result thereof is output to a memory 5 if the video signals are to be recorded; a real time information thereof is output to an image display section 6 such as an EVF. The sampling readout control section 2-2 switches its sampling control in accordance with control of an image size change control section 3 corresponding to the case of recording to memory 5 and the case of displaying at the image display section 6.

Figure 2:
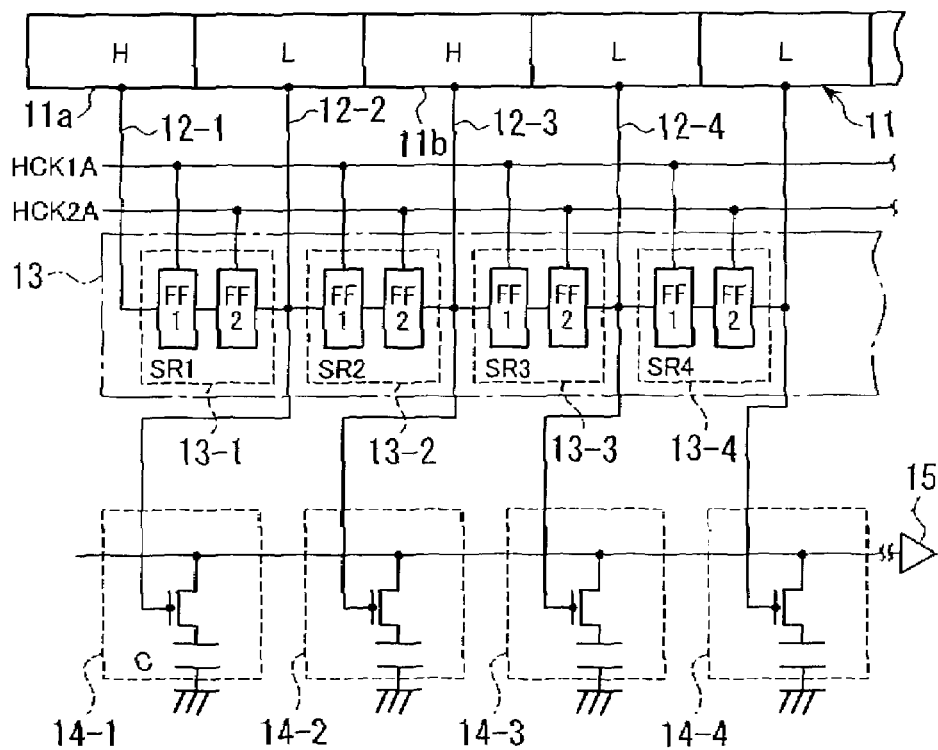
FIG. 2 shows circuit construction for performing an averaging read processing in the imaging module shown in FIG. 1.

A description will now be given by way of FIG. 2 with respect to construction of an averaging processing circuit to be used in the averaging read processing which is a type of readout not included in the sequential all-pixel readout, and which is fundamental read operation in the imaging module 2 of the invention. It should be noted that, for ease of explanation, what is shown in FIG. 2 is the construction for explaining the operation in one horizontal line of CMOS sensor having arrayed elements. The STB signals 12-1, 12-2, . . . from a start pulse location register 11 provided at the sampling readout control section 2-2 for designating the read starting location are transmitted as input signals to a shift register 13 for driving the CMOS sensor. In the illustrated example, the operation of the shift register 13 is effected by two-phase flip-flops (FF). The first phase flip-flop FF1 is driven by the clock signal HCK1A and the second phase flip-flop FF2 is driven by the clock signal HCK2A so as to perform transmitting operation to the shift register units (SR1) 13-1, (SR2) 13-2, . . . etc. When the output of each shift register unit has been driven to "H", the gate of the respective CMOS sensor element 14-1, 14-2, . . . of the CMOS sensor is opened to read a signal by activating the line for reading the voltage corresponding to photoelectric charge accumulated at each capacitor C.

Here, if the two locations 11a, 11b of the start pulse location register 11 for designating read start location are simultaneously driven to "H" so as to simultaneously activate the respective first phase FF1 of the shift register units 13-1, 13-3 at the corresponding two locations, the outputs of the respective second phase FF2 of the shift register units 13-1, 13-3 are simultaneously driven to "H" to open the respective gates of the CMOS sensor elements 14-1, 14-3. What is read out thereby is a result of averaging the voltages of the respective capacitors C at the two designated locations. In particular, the voltages of the respective capacitors C of CMOS sensor elements 14-1 and 14-3 are averaged and read out. Thereafter, the two read locations are caused to shift toward the right side by operation of the shift register 13 such as that the respective gates of CMOS sensor elements 14-2, 14-4 are simultaneously opened.

Figure 3:
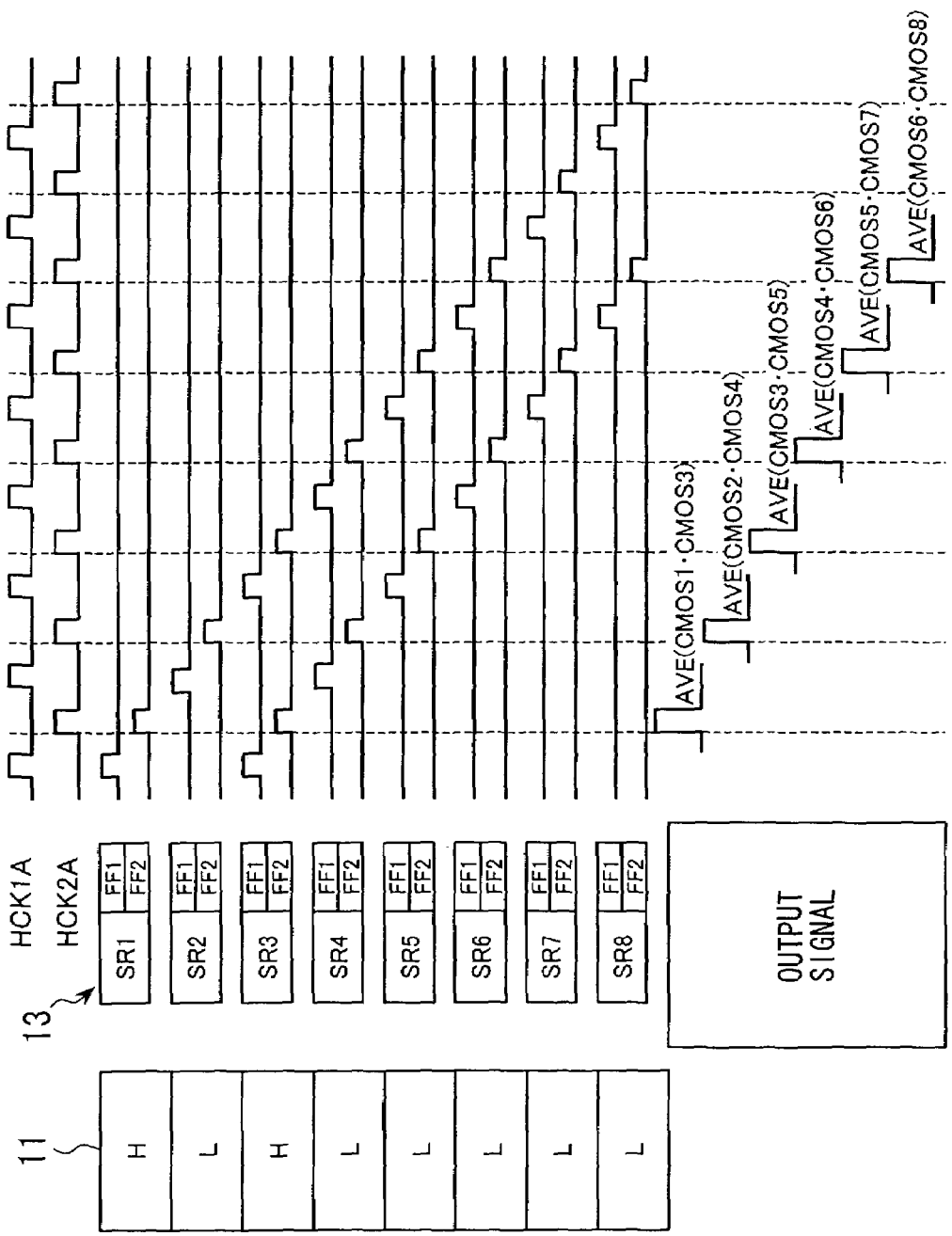
FIG. 3 is a timing chart for explaining operation of the averaging read processing circuit shown in FIG. 2.

FIG. 3 shows the contents of the start pulse location register 11 for designating the start locations to perform such averaging read operation, and in time series the operation of the two-phase shift register 13 and the output signals of CMOS sensor. As described above, sequentially output from an output terminal 15 of CMOS sensor are: an average AVE(CMOS1•CMOS3) of CMOS sensor element 14-1 and CMOS sensor element 14-3; an average AVE (CMOS2•CMOS4) of CMOS sensor element 14-2 and CMOS sensor element 14-4; an average AVE (CMOS3•CMOS5) of CMOS sensor element 14-3 and CMOS sensor element 14-5; etc.

In this manner, capacitor voltages of CMOS sensor elements of two or more locations can be read as an average by once pulse operation for driving the shift register 13. Here, supposing that the arrangement of the color filters of one line of CMOS sensor is for example R-G-R-G . . . , the above read operation means that the averaged signals are read out as sequentially shifted toward the right in such a manner as an average of two R signals, an average of two G signals that are arranged at every other pixels in the horizontal direction, respectively.

Figure 4A:
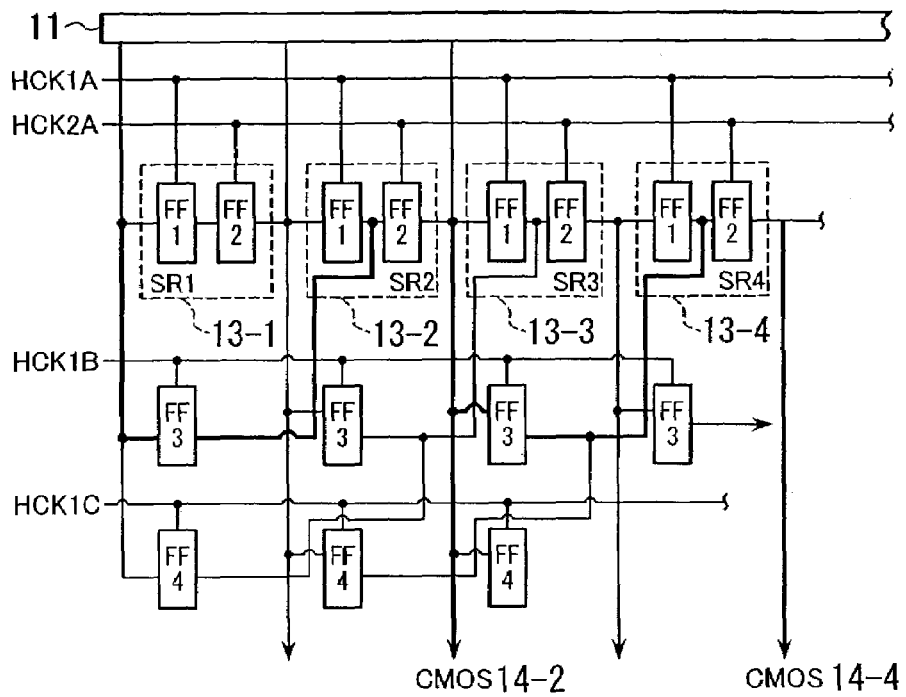
FIGS. 4A and 4B are a diagram showing the circuit construction for performing the intermittent read processing in the imaging module shown in FIG. 1 and a timing chart for explaining the operation thereof, respectively.

A description will now be given with respect to an intermittent readout of pixels which is another read method used in the invention. FIG. 4A is a block diagram showing the construction of a shift register for causing read operation of every other pixel. In the shift register for the read operation of every other pixel, third flip-flops FF3 driven by clock signal HCK1B are disposed, in parallel to the first phase FF1 of the respective shift register units 13-1, 13-2, . . . etc. The input of the third flip-flop FF3 is connected to the input of the first phase FF1, and the output thereof is connected to the input of the second phase FF2 of the shift register unit at the next location. It should be noted that, in FIG. 4A, a fourth flip-flop FF4 is also shown, since it is used also as the shift register for 2-pixel intermittent read to be described in following section.

Figure 4B:
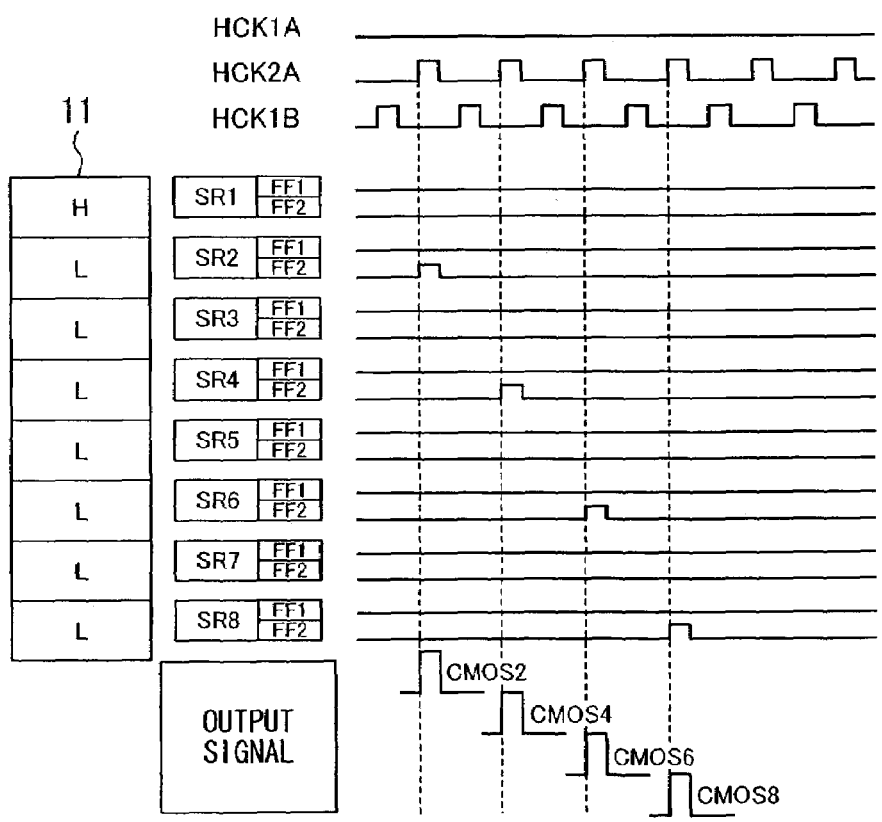

In thus constructed shift register, as shown in FIG. 4B, pulses as shown are input from the start pulse location register 11, and it is driven by the clock signals of HCK1A, HCK2A, HCK1B. The shift register thereby outputs gate control signals corresponding to CMOS sensor element 14-2, CMOS sensor element 14-4, . . . , so as to perform read operation of every other pixel so that the pixel signals CMOS2, CMOS4, . . . , are obtained from the output terminal in the order of CMOS sensor element 14-2, CMOS sensor element 14-4, . . . etc.

Figure 5:
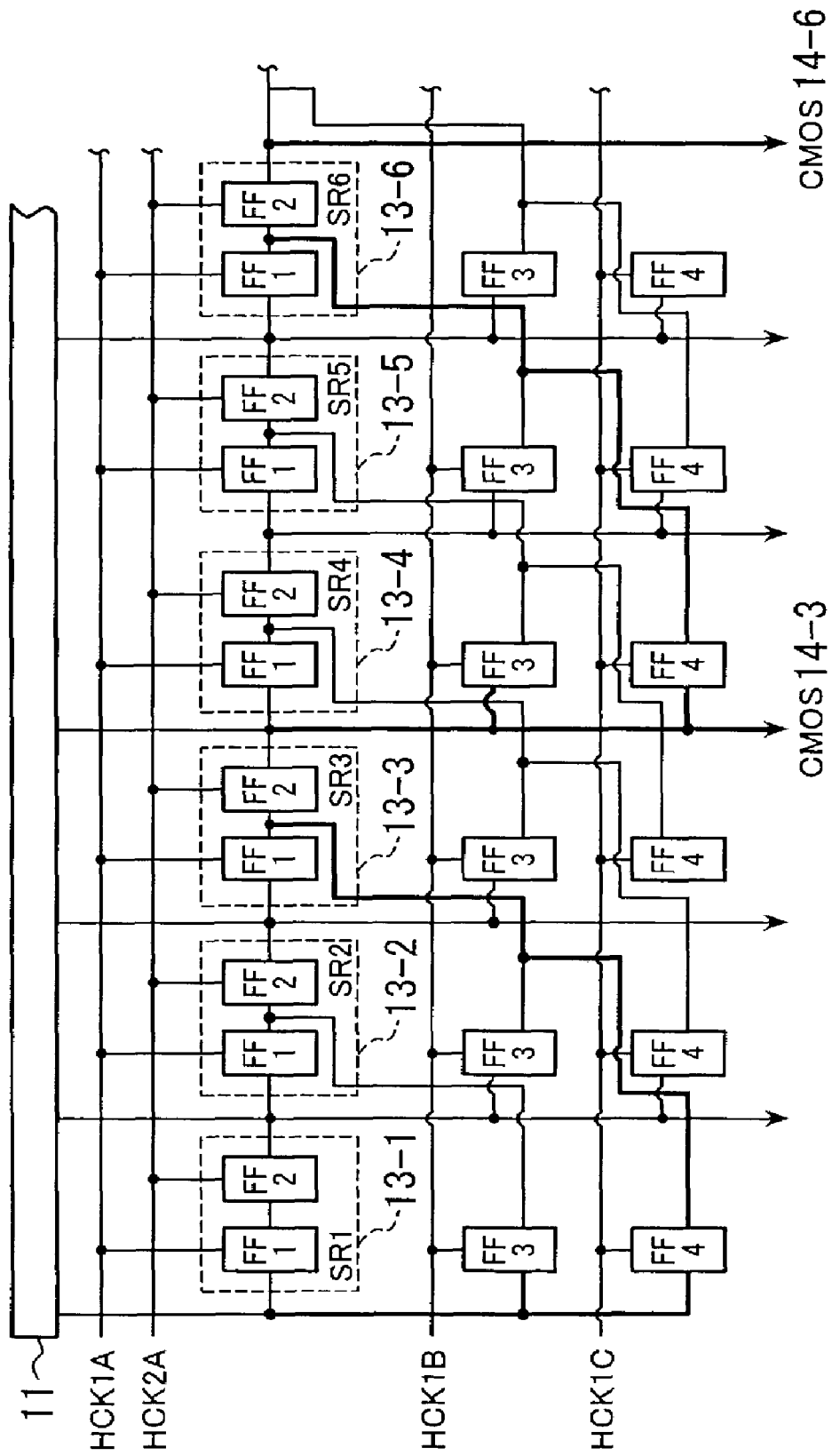
FIG. 5 shows another circuit construction for performing the intermittent read processing.

FIG. 5 is a block diagram showing the construction of a shift register for causing 2-pixel intermittent read operation. Of the shift register for such 2-pixel intermittent read operation, in parallel to the first phase FF1 of the respective shift register units 13-1, 13-2, . . . , a third flip-flop FF3 to be driven by clock signal HCK1B is disposed and at the same time a fourth flip-flop FF4 to be driven by clock signal HCK1C is disposed. The input of the fourth flip-flop FF4 is connected to the input of the first phase FF1, and the output thereof is connected to the second phase FF2 of the shift register unit 13-3 (SR3) at one stage after the next.

Figure 6:
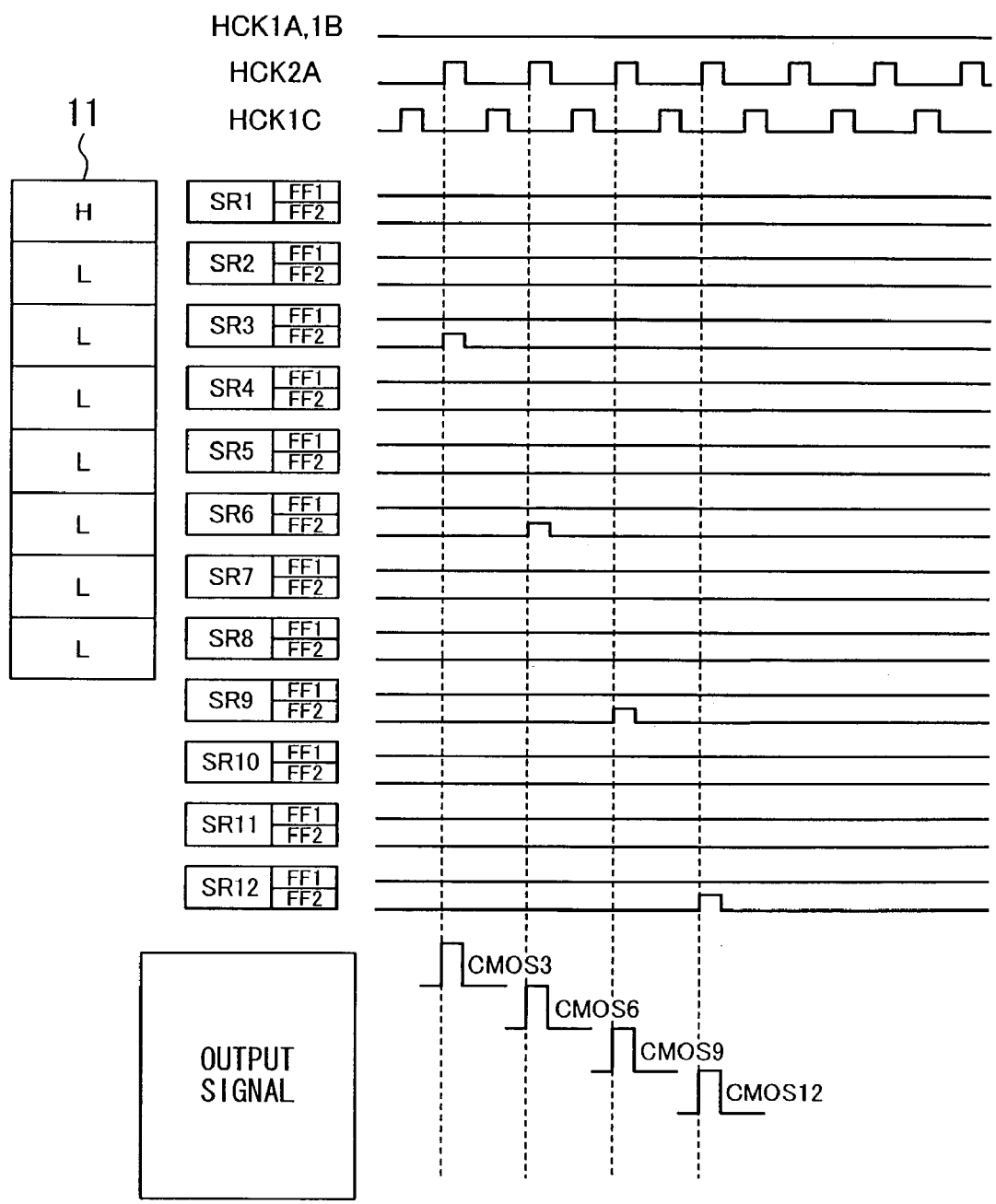
FIG. 6 is a timing chart for explaining operation of the intermittent read processing circuit shown in FIG. 5.

In thus constructed shift register, as shown in FIG. 6, pulses as shown are input from the start pulse location register 11, and it is driven by the clock signals of HCK1A, HCK2A, HCK1B, HCK1C. The shift register thereby outputs gate control signals corresponding to CMOS sensor element 14-3, CMOS sensor element 14-6, . . . , so as to perform 2-pixels intermittent read operation. The pixel signals CMOS3, CMOS6 are obtained from the output terminal in the order of CMOS sensor element 14-3, CMOS sensor element 14-6, . . . etc.

As the above, in addition to all-pixel sequential readout of CMOS sensor, it is made possible to perform a concurrent readout (averaging) or intermittent readout, by providing to the sampling control section 2-2 the read start locations for the start pulse location register and information of averaging and information of skip (thinning out) in accordance with the control signals from the image size change control section 3 in FIG. 1, and by controlling the respective shift register drive clock signals.

A description has been given with respect to the fundamental types of averaging read and skip (intermittent) read of pixels that are required in the read operation of the invention. In the invention, an image processing operation is performed by a combination of these two types of read operation.

In a first embodiment below, a description will be given with respect to:

(1) readout by rectangular blocks having different phase frame by frame;
(2) phase compensation filtering of read locations of (1);
(3) readout by blocks having different phase of read location in the horizontal direction within frame;
(4) reduction of color moire by an inter-frame comparison processing of the read method of (1);
(5) phase shift between frames of the read method of (3);
(6) readout by parallelogram shape, a combination of readout by parallelogram shape and rectangular shape; and
(7) phase shift between frames of the read method of (5).

Further, a description will be given in a second embodiment with respect to:

(8) intra-frame phase shift by combination of averaging read and intermittent read;
(9) inter-frame phase shift of the read method of (8);
(10) Y/C separation, composite processing using the read method of (9); and in a third embodiment with respect to:
(11) another example of construction of (10), i.e. an example where G signals are read out instead of Y signals so as to make Cr=R−G, Cb=B−G and G signals are read out through a low-pass filter; and in a fourth embodiment with respect to:
(12) an example where switching between the interframe interpolation and intraframe interpolation of Y(G) signals of Y/C separation read method is performed by detection of motion of object.

First Embodiment

Figure 7:
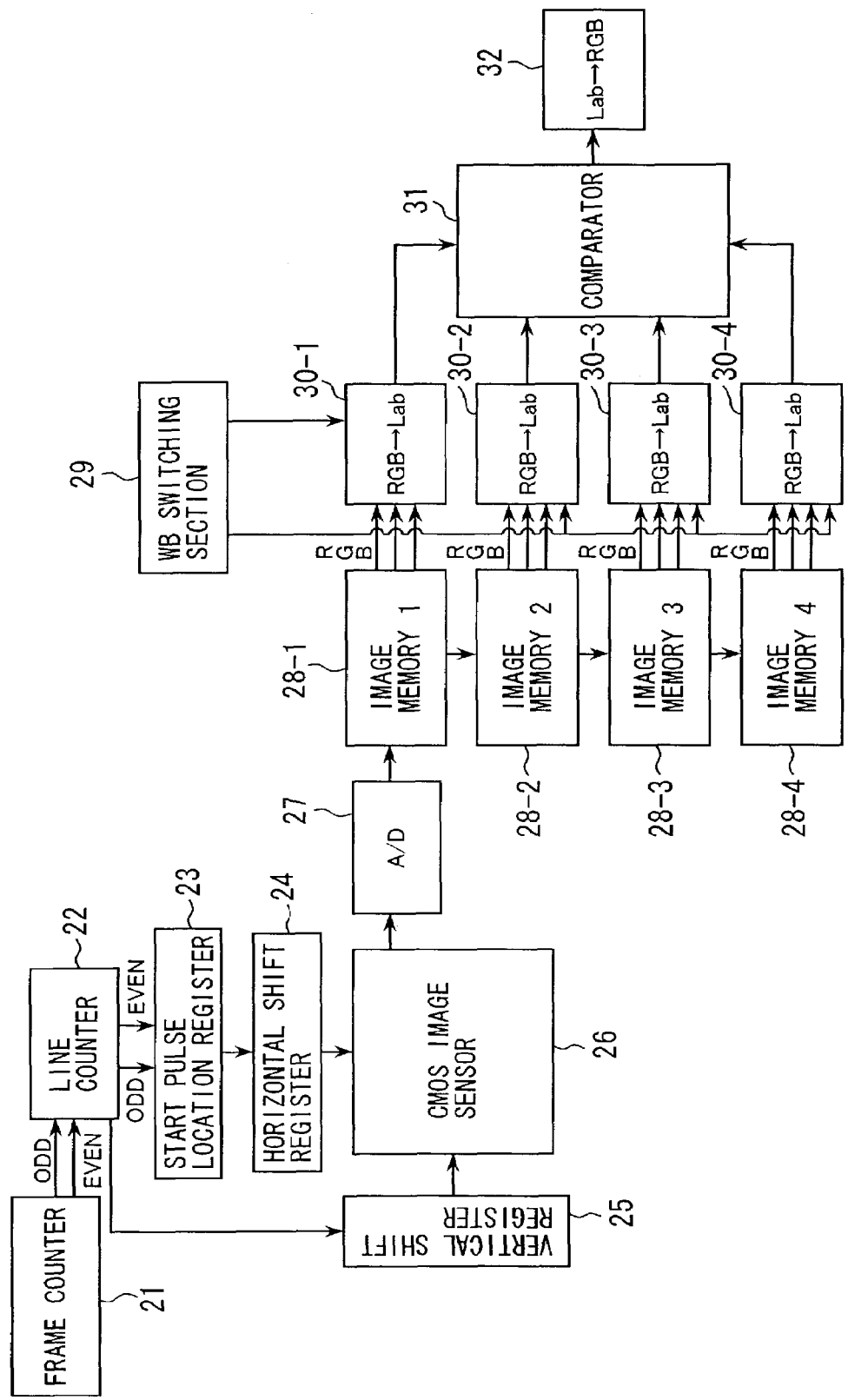
FIG. 7 is a block diagram showing construction of a first specific embodiment of the imaging apparatus according to the invention.

As a first specific embodiment of the invention, a description will now be given with respect to an imaging apparatus in which rectangular blocks having different phase are read out with shifting the location of sampling frame by frame. The respective block image data of consecutive frames read out at the shifted locations are then compared with each other to select a block image data with least false color so as to suppress the color moire. FIG. 7 is a block diagram showing the imaging apparatus based on such technique.

Figure 8A:
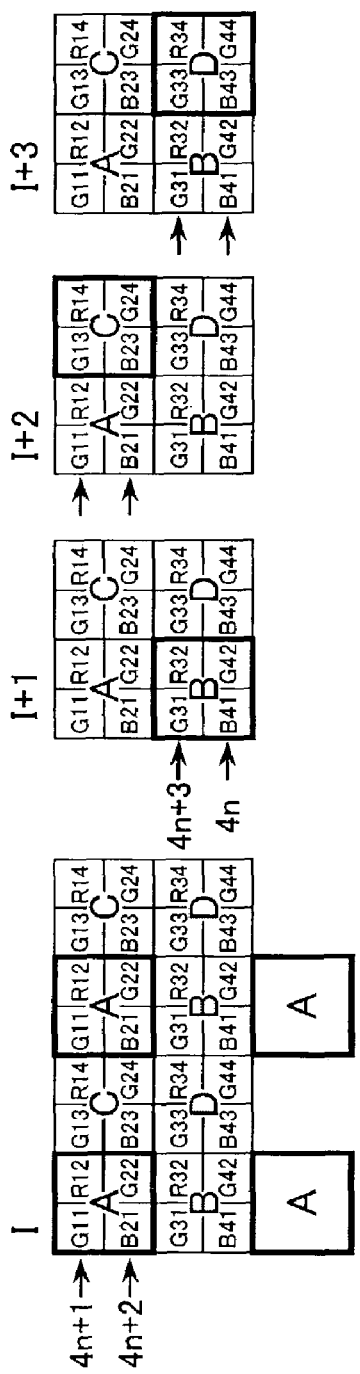
FIGS. 8A and 8B show the manner of phase shifted readout of each frame when the intermittent read pixel location region is formed as a rectangular block in the first embodiment shown in FIG. 7.

In this embodiment, as in FIG. 8A, an example is shown of change into an image having $\frac{1}{16}$ size by dividing the image data into basic blocks each having 4×4 pixels. Each basic block is further divided into four sampling read unit blocks A, B, C, D each being a set of RGB of 2×2 pixels. The readout is then performed by shifting the sampling location of the read unit blocks frame by frame (phase shifted readout) such that unit block A is read out at I-th frame, unit block B at I+1-th frame, unit block C at I+2-th frame, and unit block D at I+3-th frame. In FIG. 8A, only the unit blocks A are shown at four locations to illustrate the construction where such 2×2 pixel rectangular read unit blocks are repeated. The data sampled by 2×2 pixel unit blocks for a 4×4 pixel basic block are allocated to pixel data (RGB) of the same location in the $\frac{1}{16}$ reduction sampling.

Figure 8B:
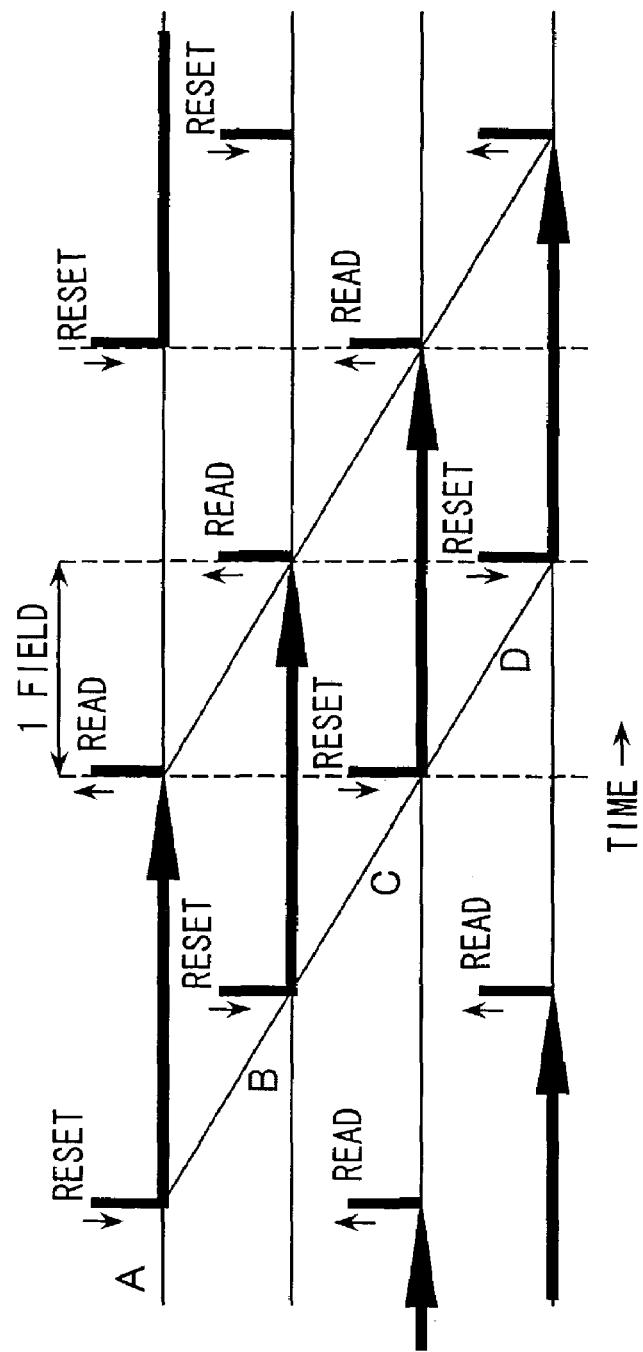

FIG. 8B is a timing chart showing the manner of frame exposure (2-field exposure) of each read unit block in the case of causing to perform phase shifted readout of the read unit blocks A, B, C, D shown in FIG. 8A. The transverse axis represents time. Considering that signal of a light receiving element is reset when readout of the same line is performed, the signal of the horizontally next unit block C is reset when unit block A has been read out. At the time of reading the signal of unit block C, a signal accumulated between reset-time and readout-time. In the pattern shown in FIG. 8A, signal accumulated for two frames is read out at the time of readout of each unit block. By shifting the sampling blocks in this manner, an advantage of phase shift is attained so that an occurrence of color moire is suppressed.

To perform phase shifted readout by such read unit blocks, a frame counter 21 and line counter 22 are provided as shown in FIG. 7 in the imaging apparatus according to the present embodiment. A designation is thereby made as to which unit block of the four read unit blocks A, B, C, D is read out in a 4×4 pixel basic block so as to read CMOS sensor 26 by causing operation of the start pulse location register 23, horizontal shift register 24 and vertical shift register 25.

Figure 9A:
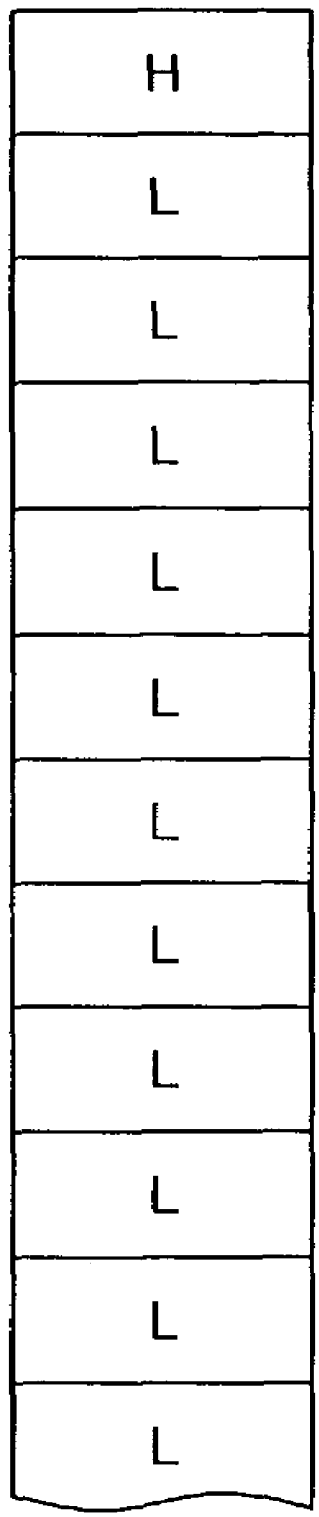
FIGS. 9A and 9B show contents of the start pulse location register for causing the readout shown in FIGS. 8A and 8B.
Figure 9B:
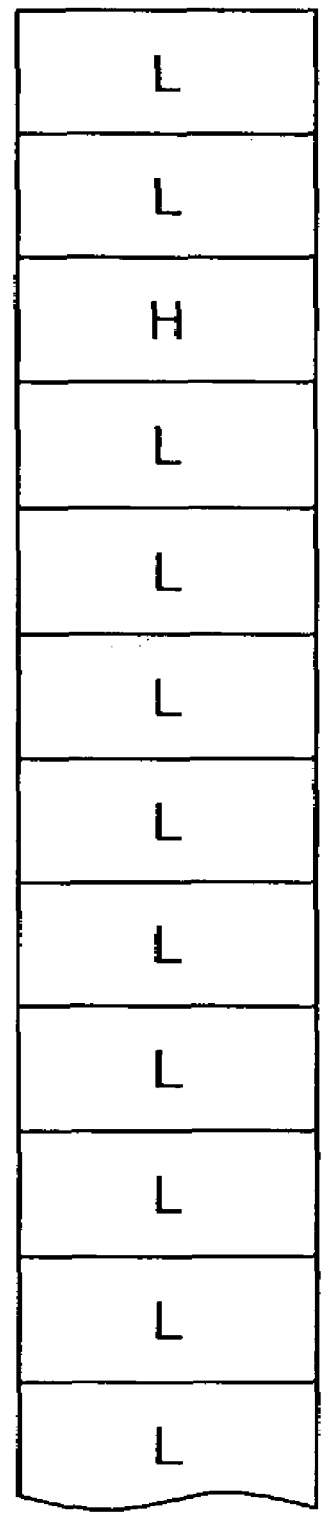
Figure 10:
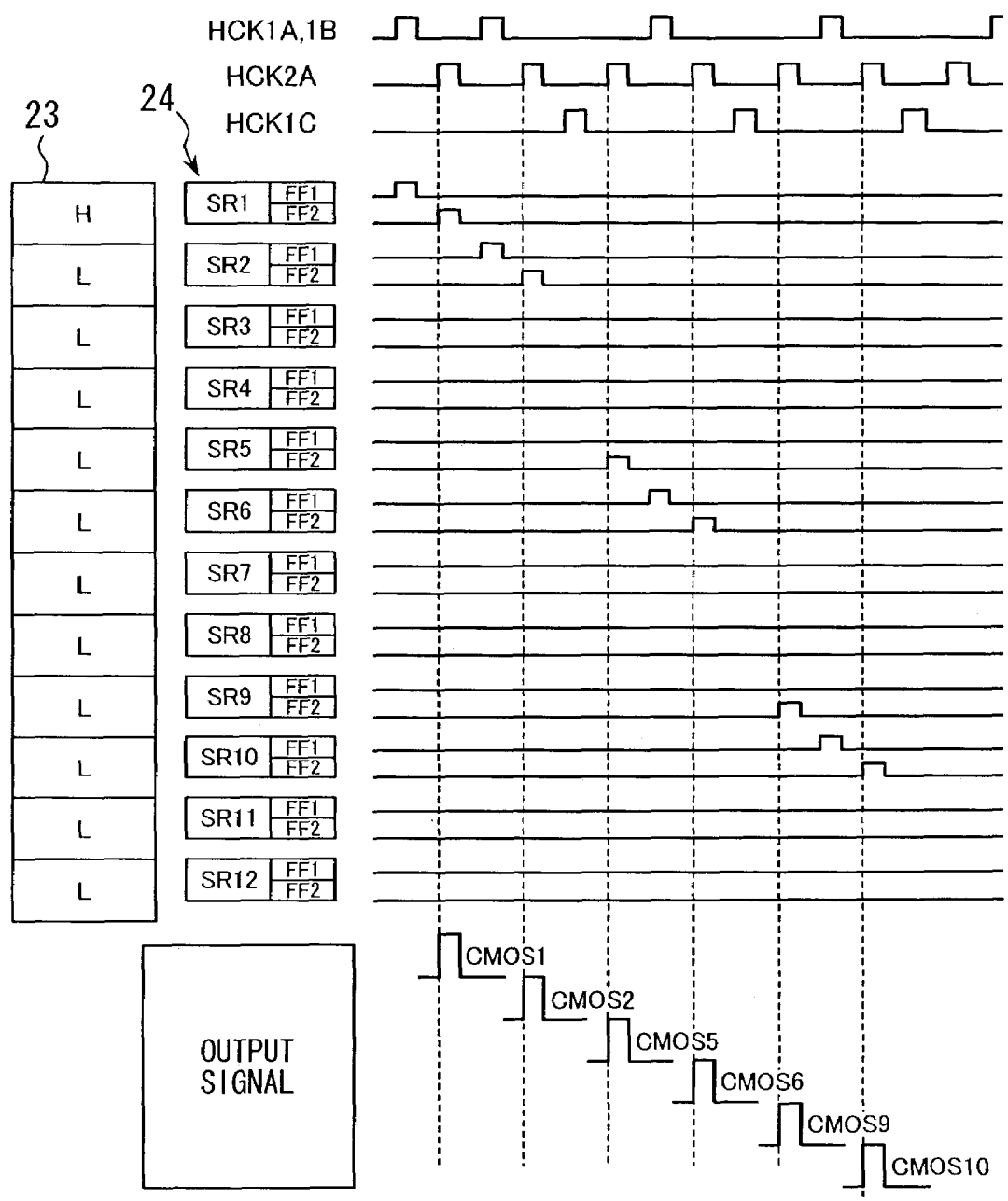
FIG. 10 is a timing chart for explaining shift register operation in reading rectangular block A in FIGS. 8A and 8B.

Here, the contents of the start pulse location register 23 for designating the start pulse location of the shift register to be used are shown as the contents of start pulses 1 and 2 shown in FIGS. 9A and 9B. FIG. 10 shows the manner in time series of the operation of the horizontal shift register 24 and the output signals of CMOS sensor 26 in reading the read unit block A at line 4n+1 and line 4n+2 shown in FIG. 8A with setting the contents of the start pulse location register 23 as start pulse 1 shown in FIG. 9A. As shown, output signals are provided from the output terminal of CMOS sensor 26 in the sequence of CMOS1, CMOS2, CMOS5, CMOS6, . . . etc. Such operation results in a repetitive read operation where neighboring two are read and next neighboring two are skipped.

Shown in Table 1 are the relationship between frame number and sampling read unit block in the example of sampling readout shown in FIG. 8A and the contents of the start pulse location register for the horizontal lines 4n+1, 4n+2, 4n+3, 4n (n: integer) corresponding to such relationship between frame number and sampling read unit block.

TABLE 1

| Frame No./<Sampling read unit block> | | | | | | | |
|---|---|---|---|---|---|---|---|
| I/<A> | | I + 1/<B> | | I + 2/<C> | | I + 3/<D> | |
| Line No. | | | | | | | |
| 4n + 1, 4n + 2 | 4n + 3, 4n | 4n + 1, 4n + 2 | 4n + 3, 4n | 4n + 1, 4n + 2 | 4n + 3, 4n | 4n + 1, 4n + 2 | 4n + 3, 4n |
| Contents of start pulse location register X: skip one horizontal line | | | | | | | |
| 1 | X | X | 1 | 2 | X | X | 2 |

For example, in order to read out the read unit block A in I-th frame, the start pulse location register of the contents of start pulse 1 shown in FIG. 9A is used at lines 4n+1, 4n+2 to perform readout, and readout of lines is not performed at lines 4n+3, 4n (indicated by X in Table 1). In the example shown in FIGS. 8A and 8B, an accumulation of charge is continued at the pixels of lines 4n+3, 4n where the above described readout of I-th frame is not performed, since the read pixels of each horizontal line after readout are reset by reset pulse so as to be brought into their accumulation state thereafter. Similarly in I+1-th frame, in order to read the read unit block B, lines 4n+1, 4n+2 are not read, and readout is performed at lines 4n+3, 4n by using the start pulse location register having the contents of start pulse 2. Further, in I+2-th frame, in order to read the read unit block C, readout is performed at lines 4n+1, 4n+2 by using the start pulse location register having the contents of start pulse 2, and readout of lines is not performed at lines 4n+3, 4n. Furthermore, in I+3-th frame, in order to read the read unit block D, lines 4n+1, 4n+2 are not read, and readout is performed at lines 4n+3, 4n by using the start pulse location register having the contents of start pulse 2.

The signals from CMOS sensor 26 having been subjected as the above to sampling readout where phase of each read unit block is shifted are converted into digital data at A/D converter 27 as shown in FIG. 7. The signals converted into digital data are then accumulated to image-memories 28-1, 28-2, 28-3, 28-4 corresponding to four image-frames of the four read unit blocks A, B, C, D. It should be noted that such memory accumulation operation corresponding to four image frames is of FIFO (first in first out) method.

In this embodiment, then, color space conversion is performed at RGB-Lab converters 30-1, 30-2, 30-3, 30-4 by using white balance data switched for each light source of image taking by a WB switching section 29. The color saturation of color signals of each sampling image converted into Lab is then subjected to comparison operation at a comparator 31 to select the sampling image frame of color signals having lowest color saturation. Next, Lab-RGB inverse converter 32 is used to make conversion into RGB image signals. It is thereby possible to obtain sampling RGB image signals having least color moire.

As the above, an advantage of phase shift can be obtained to reduce an occurrence of color moire, by shifting frame by frame the sampling pattern, i.e. sampling read unit blocks. With the above technique, however, though an occurrence of moire can be suppressed, a flicker is caused if such sampling result is used without modification as $\frac{1}{16}$-size image signals, since the location of unit block to be sampled is shifted and different from one frame to another.

Figure 11A:
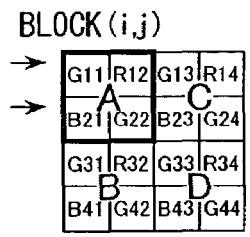
FIGS. 11A to 11D show the manner of phase compensation filtering at the time of phase shifted readout by each frame of rectangular blocks in FIGS. 8A and 8B.
Figure 11C:
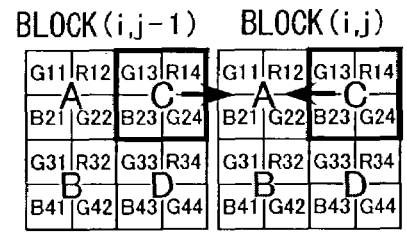
Figure 11B:
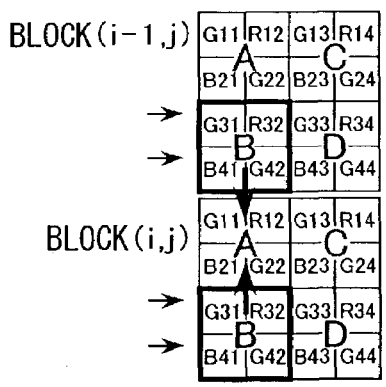
Figure 11D:
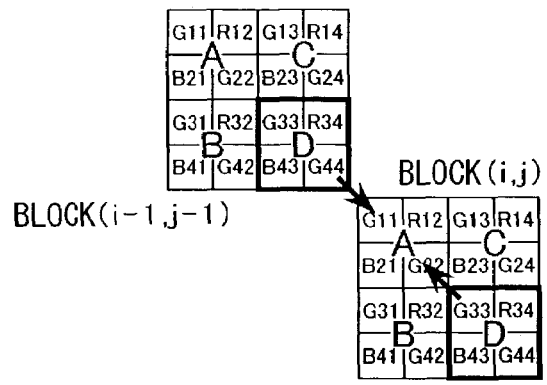
Figure 12:
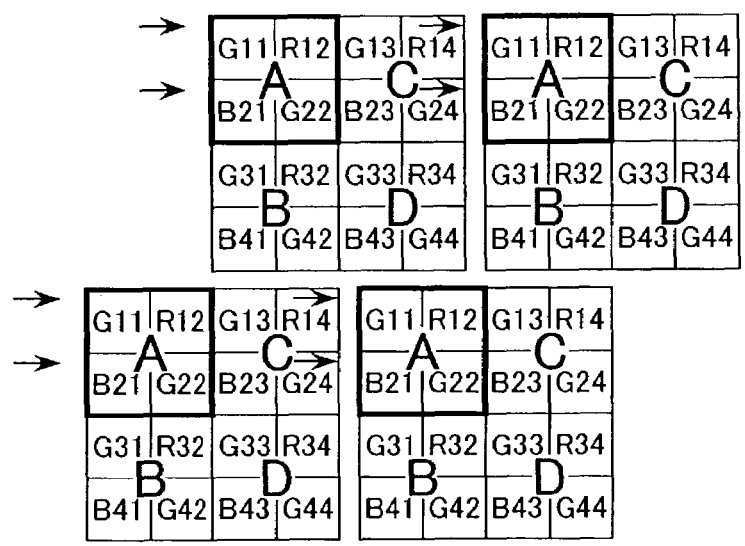
FIG. 12 shows the manner of read phase shift within the same frame in the intermittent read of rectangular blocks shown in FIGS. 8A and 8B.

In order to prevent such disadvantage, a flicker can be prevented such that, as shown in FIGS. 11A to 11D, the signals of two same read unit blocks of adjoining two basic blocks after readout are subjected to an averaging operation to perform phase compensation. In particular, supposing for example the read unit block A of a basic block (i,j) as the reference as shown in FIG. 11A, an averaging filtering in the vertical direction, i.e. an averaging between the signals of read unit block B of the basic block (i,j) and those of read unit block B of the basic block (i−1,j) is performed in the sampling of read unit block B. Further, in the sampling of read unit block C, an averaging filtering in the horizontal direction, i.e. an averaging between the signals of read unit block C of the basic block (i,j) and those of read unit block C of the basic block (i,j−1) is performed. Furthermore, in the sampling of read unit block D, an averaging filtering in a diagonal direction, i.e. an averaging between the signals of read unit block D of the basic block (i,j) and those of read unit block D of the basic block (i−1,j−1) is performed. The condition of sampling is thereby achieved as that performed at the same location as read unit block A in all frames so that flicker can be effectively prevented. It should be noted that, thereafter, the color saturations are likewise compared to select and output the signals of least color saturation.

The sampling pattern in the description of the above embodiment has been shown as but is not limited to that divided into blocks where 4×4-pixel basic blocks are regularly arranged without a vertical/horizontal shift in an image frame. For example, it can also be divided as shown in FIG.

12 so that the 4×4-pixel basic blocks are located as horizontally shifted by two pixels from each other, i.e. in a hound's-tooth check arrangement. In the illustrated example, since a read unit block becomes one pixel when formed into a reduced image, the condition shifted by about a half pixel results so that, though flicker occurs, a color moire becomes less conspicuous.

Figure 13A:
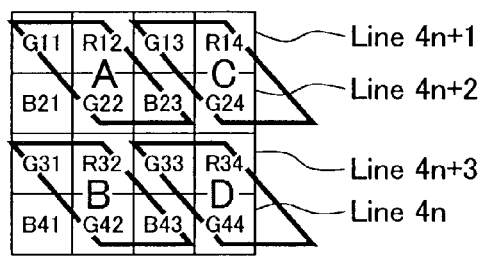
FIGS. 13A to 13E show the manner of readout in the case of a parallelogram shape used as the intermittent read pixel location region and in the case of a combination of parallelogram shape and rectangular shape.

Further, the respective start pulse location in the above embodiment has been shown as the same between lines 4n+1 and 4n+2 or between lines 4n+3 and 4n in the 4×4-pixel basic block and each of the read unit blocks A, B, C, D is formed into a rectangular pattern. Different from this, each of the read unit blocks A, B, C, D in sampling can be formed into a parallelogram pattern as shown in FIG. 13A by shifting by one pixel the start pulse locations at lines 4n+1 and 4n+2 and the start pulse locations at lines 4n+3 and 4n, respectively. A full-color data in reduced size can be formed by using the read unit blocks of such parallelogram pattern.

Figure 13B:
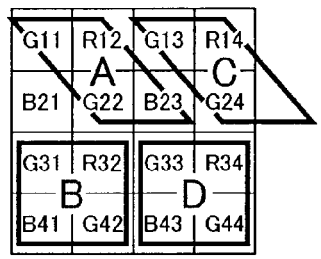
Figure 13C:
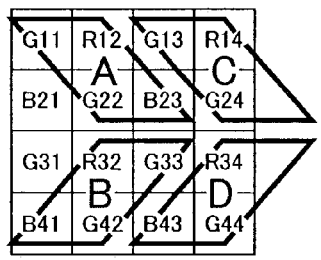

In this manner, sampling also of 2×2 pixels and RGB+G and with a phase relationship in CFA (color filter array) different from the rectangular pattern can be performed by forming the read unit blocks in parallelogram pattern. As shown in FIG. 13B, therefore, a phase shift of sampling becomes possible by performing the sampling with mixing the read unit blocks of parallelogram pattern and the read unit blocks of rectangular pattern. Further, as shown in FIG. 13C, the sampling can be performed also by mixing and arranging read unit blocks of parallelogram patterns of different orientation so that they are symmetrical in the vertical direction. It should be noted that the manner of sampling by the patterns shown in FIGS. 13B, 13C is the sampling within one frame and is not to perform the sampling of the respective read unit blocks over a plurality of frames.

Figure 13D:
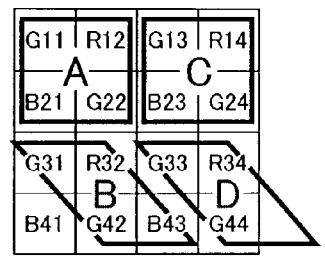
Figure 13E:
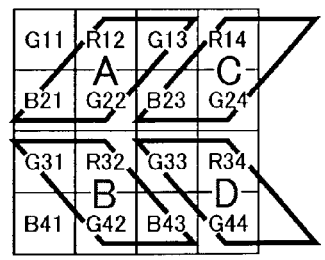

Further, it is also possible that the sampling by mixture of parallelogram pattern and rectangular pattern as shown in FIG. 13B or the sampling by a combination of parallelogram patterns having different orientation as shown in FIG. 13C is switched frame by frame. In particular, while in the case of FIG. 13B the read unit blocks A, C are parallelogram patterns and read unit blocks B, D are rectangular patterns, the sampling in the next frame is performed as shown in FIG. 13D by forming the read unit blocks A, C into rectangular pattern and read unit blocks B, D into parallelogram pattern. Further, the parallelogram patterns as shown in FIG. 13E obtained by inverting the orientation of the parallelogram patterns of the read unit blocks in FIG. 13C are used in sampling to switch frame by frame between the sampling patterns that are shown in FIG. 13C and FIG. 13E. In this manner, moire can be reduced by switching the sampling pattern of read unit blocks between frames. Furthermore, in order to perform phase shift between frames, it is also possible to perform sampling in the pattern shown in FIG. 13D in EVEN frames while sampling is effected in the pattern of FIG. 13B in ODD frames or similarly to perform sampling in the pattern shown in FIG. 13E in EVEN frames while sampling is effected in the pattern of FIG. 13C in ODD frames.

In the case where the cause of color moire is the regularity of sampling phase, an equivalent advantage as the sampling by performing phase shift can be obtained to achieve a reduction in moire by combining the sampling in parallelogram pattern and the sampling in rectangular pattern as described above and in addition by switching the sampling pattern between frames.

Second Embodiment

In an image sensor having CFA thereon, an identical processing as linear interpolation can be performed by an averaging of pixels. Even at a pixel of the location at which it is in actuality impossible to obtain pixel value of a subject color, a pixel value of the subject color at that location is artificially produced by means of such processing as interpolation. Generally, in a regularly arranged CFA such as Bayer matrix, since sampling lattice is regular for each color in the intermittent processing, color moire due to high-frequency pattern of object is caused to occur.

To suppress an occurrence of color moire, a method of applying phase shift is a consideration in addition to the method for limiting band by a low-pass filter as in the above described interpolation processing. A system for artificially performing phase shift of readout by using an averaging read will thus be shown as a second embodiment. A description will be given on assumption that signals of CFA of R, G, B are to be read as shown in FIGS. 14A, 14B.

Figure 14A:
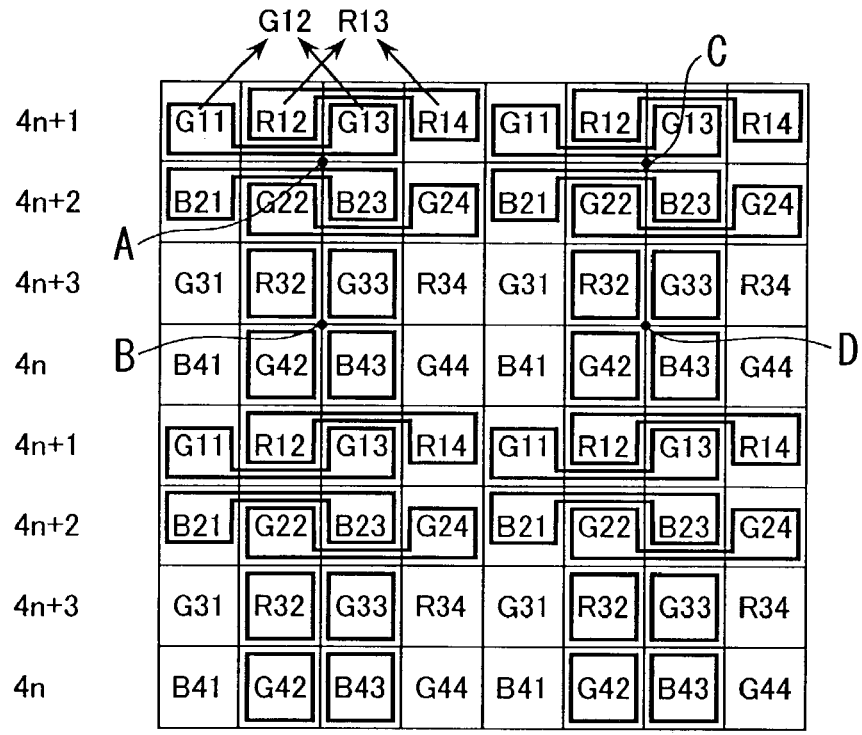
FIGS. 14A and 14B show the manner of inter-frame phase/band shift by the averaging read and intermittent read in a second embodiment of the invention.

In this embodiment, as shown in FIG. 14A, an averaging readout is performed at lines 4n+1 and 4n+2, while, at lines 4n+3 and 4n, an averaging readout is not performed and neighboring two are read and next neighboring two are skipped (intermittent readout). The signals of G11, G13 of line 4n+1 are read out in an averaging read method. The averaging process is identical to linear interpolation, and this corresponds to a G signal (G12) at the location of R12 by approximation based on linear interpolation. In a similar manner, a R signal (R13) at the location of G13 is artificially formed by an averaging process of R12, R14. Similarly, at line 4n+2, artificial signals correspond to B22, G23 are obtained. It is seen from comparison between such artificial signal array and the array of 2×2-block CFA to be read out at lines 4n+3, 4n that the arrays are inverted in phase. In particular, the order of R-G, B-G is inverted.

By performing such operation, therefore, a phase shift of sampling in the vertical direction is possible in one frame of image so that color moire occurring in the case of a regularly intermittent read by a regular array of CFA as described is reduced. Further, it is also seen that band is different between the sampling at lines 4n+1, 4n+2 and the sampling at lines 4n+3, 4n due to the fact that the averaging process is performed. An occurrence of color moire can be suppressed also by a band limitation. As the above, an occurrence of color moire can be suppressed by using an intraframe sampling of phase and frequency (band) shift.

Figure 14B:
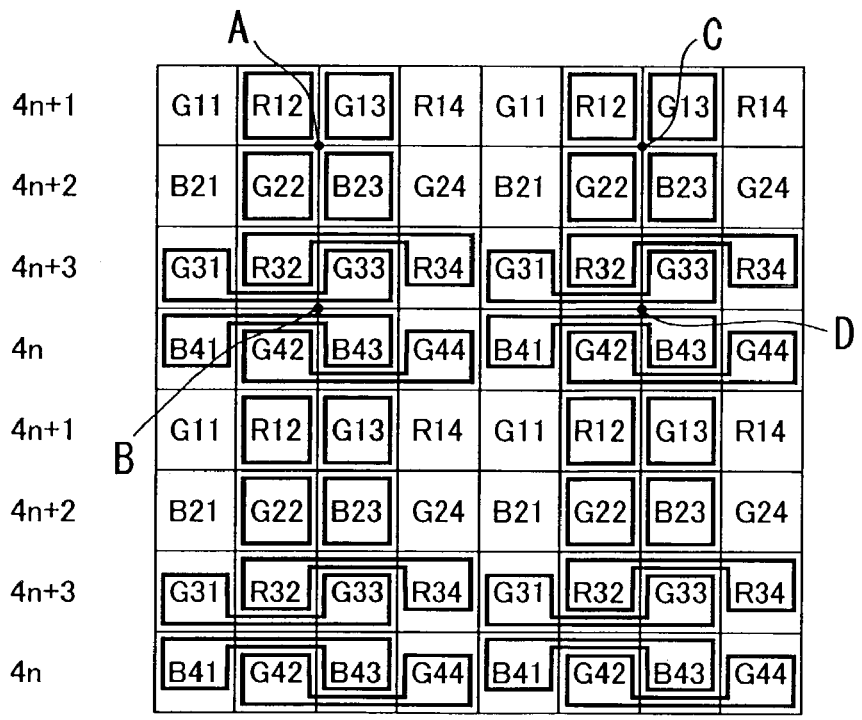

Further, moire in movie becomes less conspicuous due to the effect of wobbling by switching between frames as shown in FIGS. 14A, 14B the order of the lines for performing the averaging read and the lines for performing the intermittent read without performing averaging readout. The manner of such inter-frame and intra-frame sampling phase shift is shown in FIGS. 14A, 14B. So, the phase of the pixels location A, B, C, D is changed frame by frame where the signals of these pixels correspond to the same location in the reduced image (low-resolution image).

Figure 15:
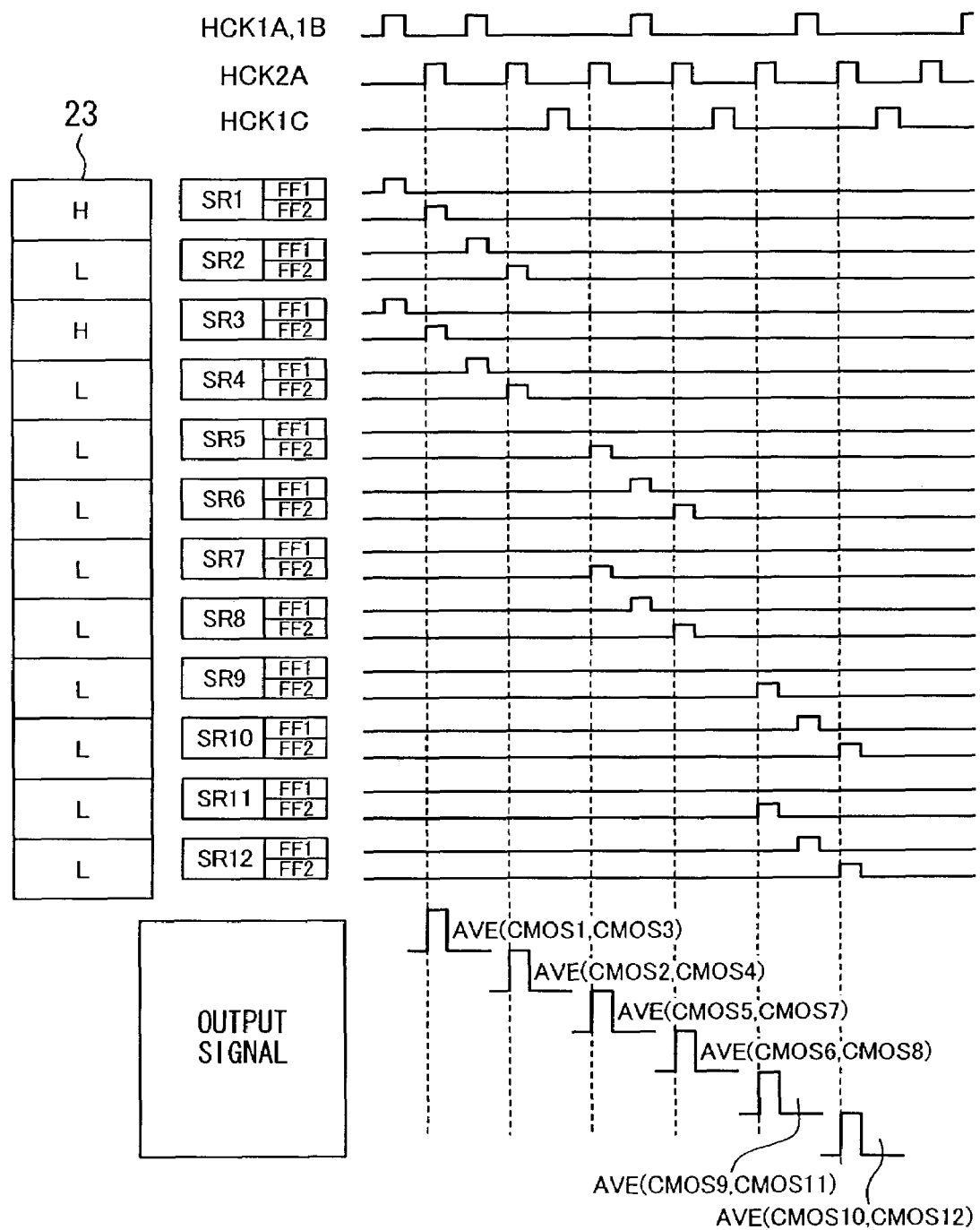
FIG. 15 is a timing chart for explaining shift register operation for the averaging read lines in the inter-frame phase/band shift readout shown in FIGS. 14A and 14B.
Figure 16:
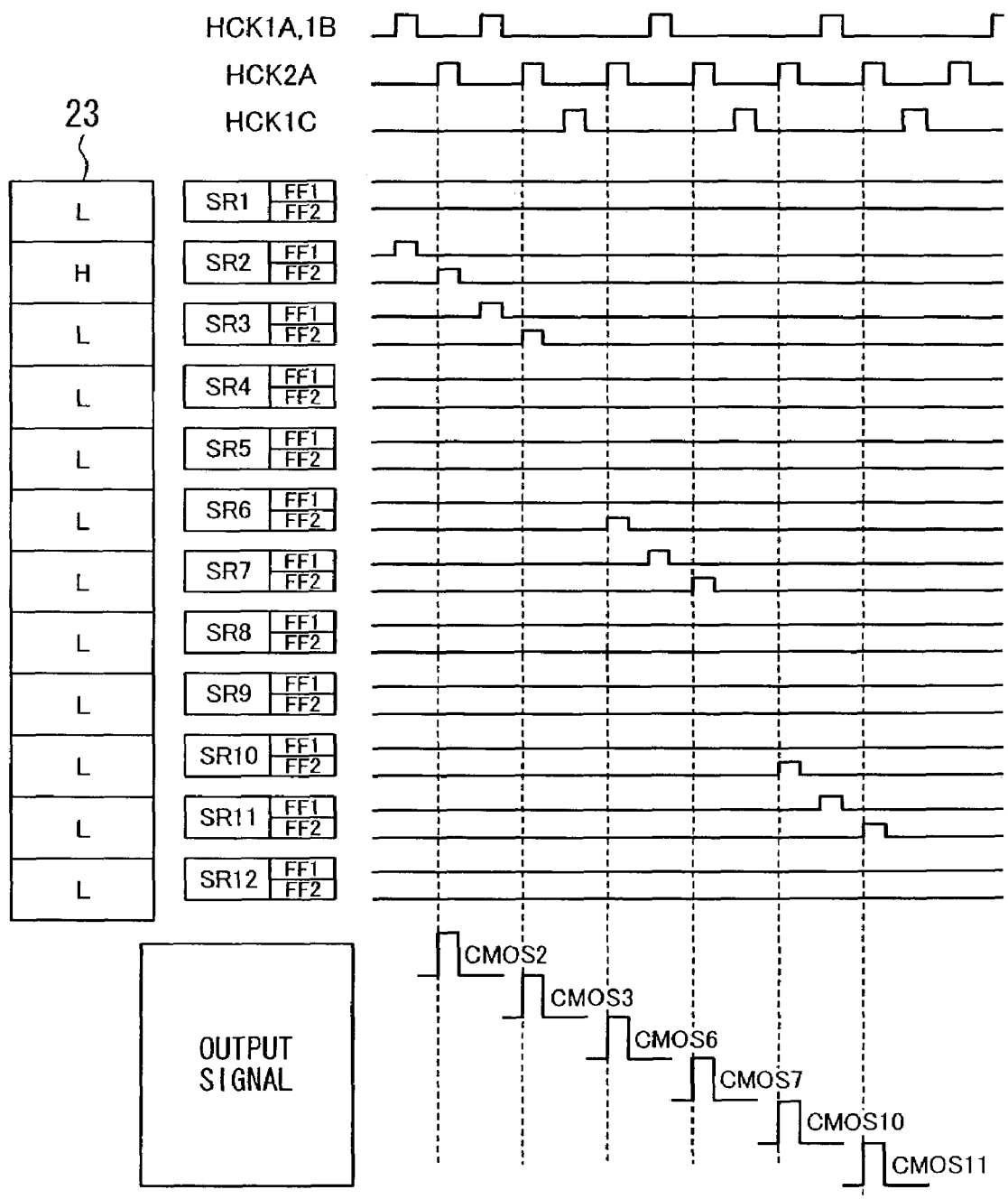
FIG. 16 is a timing chart for explaining shift register operation for the skip (intermittent) read lines in the inter-frame phase/band shifted readout shown in FIGS. 14A and 14B.

A description will now be given by way of FIGS. 15 and 16 with respect to operation of shift register in the case where, in single frame as shown in FIG. 14A, the lines 4n+1 and 4n+2 are subjected to the averaging read and the lines 4n+3 and 4n are subjected to intermittent read. Here, a timing chart corresponding to the averaging read operation of lines 4n+1, 4n+2 is shown in FIG. 15 and a timing chart of the intermittent read operation corresponding to lines 4n+3, 4n is shown in FIG. 16. In FIG. 15, "H" locations of the start pulse location register 23 correspond to the locations of SR1, SR3. At first, the first phase FF1 of these two shift register units SR1, SR3 is driven and then the second phase FF2 is driven to cause a shift toward the right. At this time, the first output is an average of CMOS 1, 3 and the second output is an average of CMOS 2, 4. Thereafter, pulse of HCL1C for causing operation of fourth flip-flop FF4 becomes "H" to perform 2-pixel skip (thinning out) and the first phase FF1 is driven once after the operation of second phase FF2. Since, in the two cycles of operation in this series, each of the combination of shift register units SR5, SR7 and the combination of shift register units SR6, SR8 is simultaneously brought to "H", an average of CMOS5, 7 and an average of CMOS6, 8 are obtained at the output. Thereafter, flip-flops are driven in the sequence of FF4, FF2, FF1, FF2.

In operation of 2-pixel consecutive read, 2-pixel skips correspond to lines 4n+3, 4n, on the other hand, "H" location of start pulse corresponds to shift register unit SR2 as shown in FIG. 16. Then the shift register is driven by FF1 (SR2), FF2 (SR2), FF1 (SR3), FF2 (SR3) and thereafter by a repetition of FF4, FF2 (SR6), FF1 (SR7), FF2 (SR7). Accordingly, only difference between the timing charts of FIGS. 15, 16 is the contents of the register indicating start location, and the operation pulses of flip-flops FF of the shift register are common in the two.

A description will now be given by way of a block diagram of FIG. 17 with respect to a specific construction for controlling the averaging read and intermittent read and performing Y/C separation/composition of output video signals in the second embodiment. In this embodiment, signals corresponding to the location of A or C shown in FIGS. 14A, 14B are: in I-th frame shown in FIG. 14A, the signals having a lowered band (frequency) due to the averaging readout from which chroma signals (Cr, Cb) are selected; and, in I+1-th frame shown in FIG. 14B, the signals of high region of band from which luminescence signal Y is selected. Conversely, from the signals corresponding to the location of B or D, luminescence signal is selected in I-th frame shown in FIG. 14A and chroma signals are selected in I+1-th frame shown in FIG. 14B.

Figure 17:
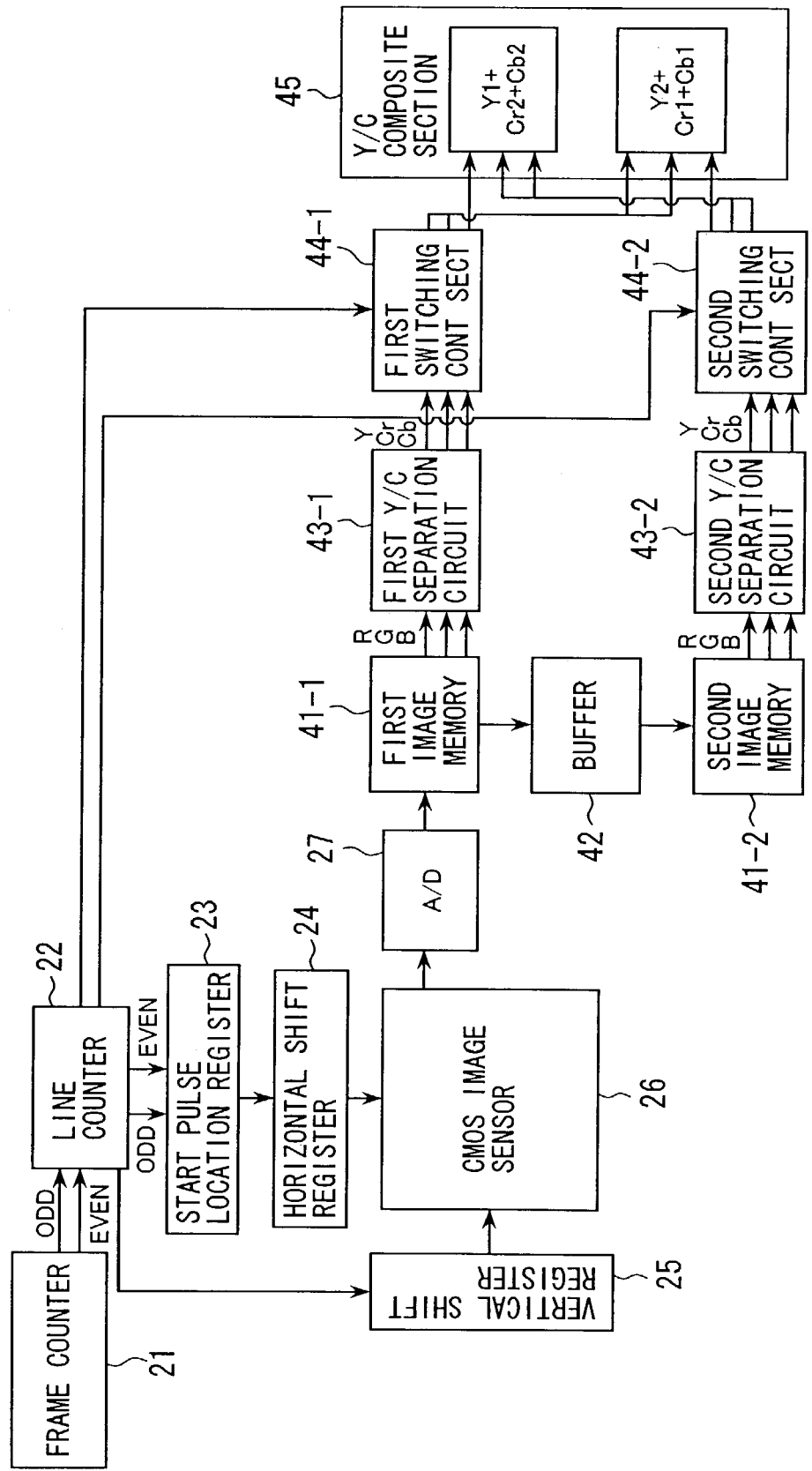
FIG. 17 is a block diagram showing a specific construction of the second embodiment.

As shown -in FIG. 17, thus, frame counter 21 and line counter 22 are provided so that the frame counter 21 watches for example ODD or EVEN of frames and the line counter 22 for example watches the residue number of 4 residue system (4n+1, 4n+2, 4n+3, 4n, n: integer). The start pulse location register 23, horizontal shift register 24, and vertical shift register 25 are then operated to drive CMOS sensor 26 so that the output signals of CMOS sensor 26 as shown above in FIGS. 15 and 16 can be obtained.

In this manner, the signals of CMOS sensor 26 are read out in accordance with the start pulse designated by frame number and vertical location and with the operation of flip-flop FF that is common in the vertical direction. The output signals of CMOS sensor 26 are converted into digital signals at A/D converter 27 and temporarily stored to a first image memory 41-1 and through a buffer 42 to a second image memory 41-2. The digital signals stored at the first and second image memories 41-1, 41-2 are then passed through a first and second Y/C separation circuits 43-1, 43-2 and input to a first and second switching control sections 44-1, 44-2 for switching the signals at the time of Y/C composition. The composition of Y/C is then performed from data of two frames at Y/C composite section 45. At this time, the rule of Y/C composition is different by frame number and by the vertical location. At the locations of A, C in the illustrated example of FIGS. 14A, 14B, chroma signals Cr, Cb of lines 4n+1, 4n+2 are used in the case of I-th frame and Y signals of lines 4n+1, 4n+2 are used in I+1-th frame. The locations of B, D are of opposite phase so that Y signals of lines 4n+3, 4n are used in I-th frame and Cr, Cb signals of lines 4n+3, 4n are used in I+1-th frame.

Particularly, full color data corresponding to the locations of A, C in I-th frame of the example shown in FIGS. 14A, 14B, is generated by obtaining R, B from a signal of averaging of 2 pixels, respectively, and obtaining G from two signals of averaging of 2 pixels, i.e. by using a total of 8 pixels. The full color data corresponding to the locations of B, D, on the other hand, is generated by using the signals of 4 pixels of RGB+G. For I+1-th frame, an opposite phase thereof is used. Here, while the generation of data using 8 pixels has a lower sampling band and thus suppresses color moire, it has a side effect of suppressing even the fine texture of object. On the other hand, the sampling by 4 pixels is capable of reproducing the fine texture but has a characteristic that a color moire tends to occur. Thus, as the above, the luminescence signal using the sampling of 4 pixels and the chroma signals at the time of performing the sampling of 8 pixels can be used at the same location (for example location A in FIGS. 14A, 14B) in consecutive frames to interpolate the signals by each other so as to obtain a high-definition image having less color moire.

Figures 18A, 18B, 19A, 19B:
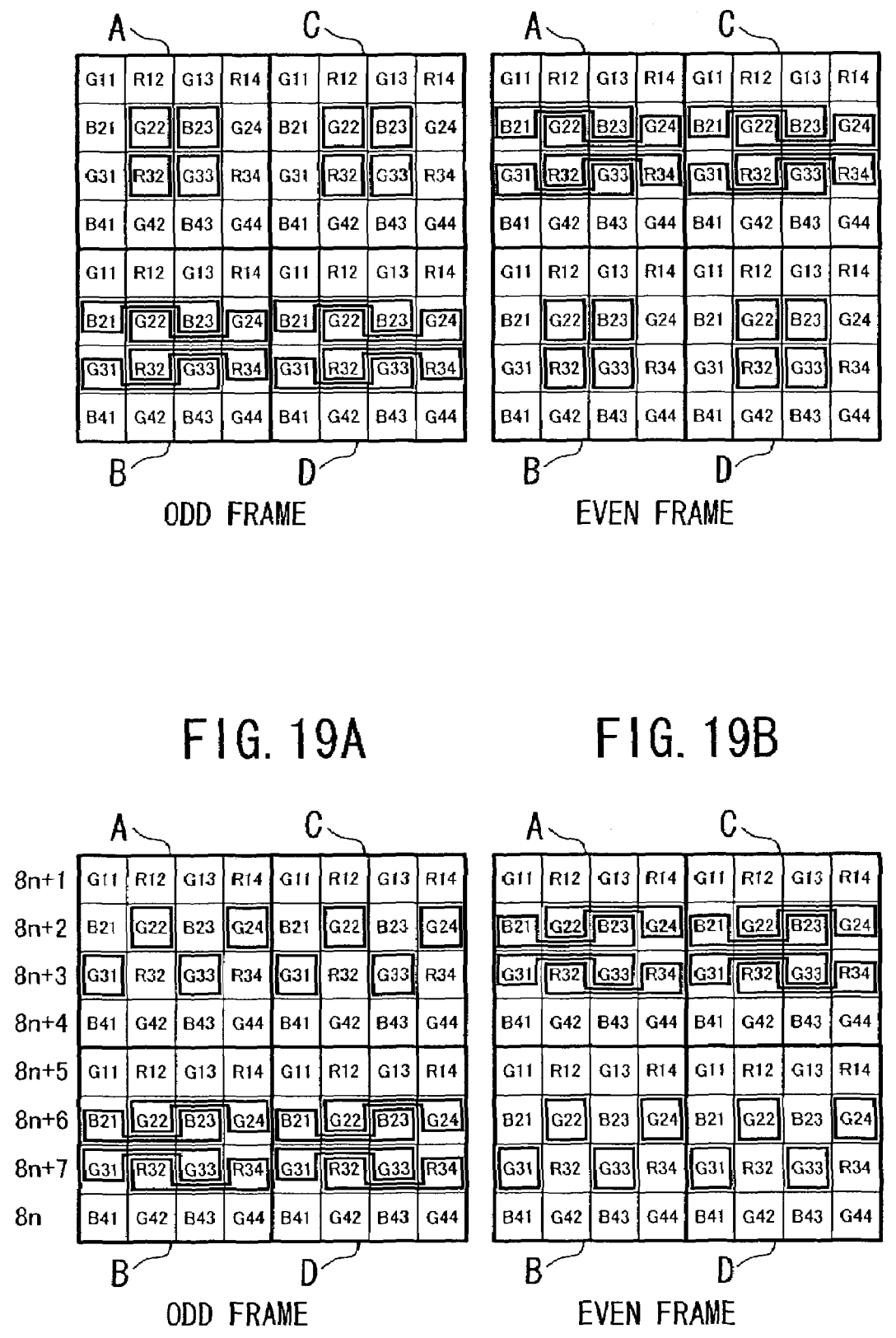

In the above embodiment, it is also possible in readout to skip lines in the vertical direction as shown in FIGS. 18A, 18B to increase the sampling speed. In particular, as shown in FIGS. 18A, 18B, partition is made to form 4×4-pixel blocks A, B, C, D as the basic blocks. In ODD frames, the first and fourth lines are not read and an intermittent read of the second and third pixels of the second and third lines is performed in blocks A, C, while, in blocks B, D, the first and fourth lines are not read and an averaging read is performed of the first and third pixels and of the second and fourth pixels of the second and third lines. In EVEN frames, on the other hand, the sampling rule (pattern) is exchanged so that the averaging read in blocks A, C, and the intermittent read for blocks B, D, are performed. In this manner, the sampling speed can be increased by setting horizontal lines that are not read out.

Further, as a modification of this embodiment, it is also possible that the color signals obtained by passing signals of an entire frame through a low-pass filter and the luminescence signals obtained from signals of an intermittent sampling of an entire frame are switched frame by frame to perform composition in a selective manner.

Third Embodiment

A third embodiment will now be described. In this embodiment, in order to reduce moire of Y signal (luminance moire) in performing Y/C separation processing in the second embodiment, luminescence (Y) signals, after once read out in the direction of line, are passed through a low pass filtering operation, and resized with a subsampling. In particular, instead of the sampling rule (pattern) shown in FIGS. 18A, 18B, Y/C separation/composite processing is performed as shown in FIGS. 19A, 19B by using a combination of two readout lines of only G channel and two lines of averaging read, i.e. Y signal obtained from sampling of G channel of two lines and Cb, Cr signals obtained from averaging read of two lines.

At this time, the number of operation pulse of readout line of G channel is the same as the example shown in FIGS. 18A, 18B. For example, sampling of G is performed twice in one line of 4×4 block (second and third columns of block A of FIGS. 19A, 19B). Further, its timing with the averaging sampling can be adjusted. Note that the averaging sampling is also operated by two pulses with respect to one line of 4×4 block. In ODD frame of FIG. 19A, the second and third lines of blocks A, C, correspond to sampling of G, where sampling is performed by thinning out every other pixel. This intermittent sampling is operated by the combination of clock signal HCK1B and HCK2A as shown in FIG. 4B. At the second and third columns, however, the location of start pulse is shifted by one.

As shown in FIGS. 19A, 19B, the sampling rule is exchanged between the ODD frames and EVEN frames so that the luminescence signal and color signals corresponding to the same location of image are selected from two frames in a similar manner as the second embodiment. The rule for selection at that time is designated by field and line numbers also as described in FIG. 17. In the third embodiment, the pulse sequence of the shift register to be used is different between the averaging sampling and the sampling of G channel, and in addition the start pulse location is different between the samplings of the second line and third line of G channel. In other words, since the location of start pulse and the pulse sequence for driving the shift register are respectively different by field numbers and by line numbers, a means for selecting and setting these is required. Further, with respect to sampling of G channel, a processing through a low-pass filter (horizontal low-pass) is effected after the sampling to reduce luminance moire.

Figure 20A:
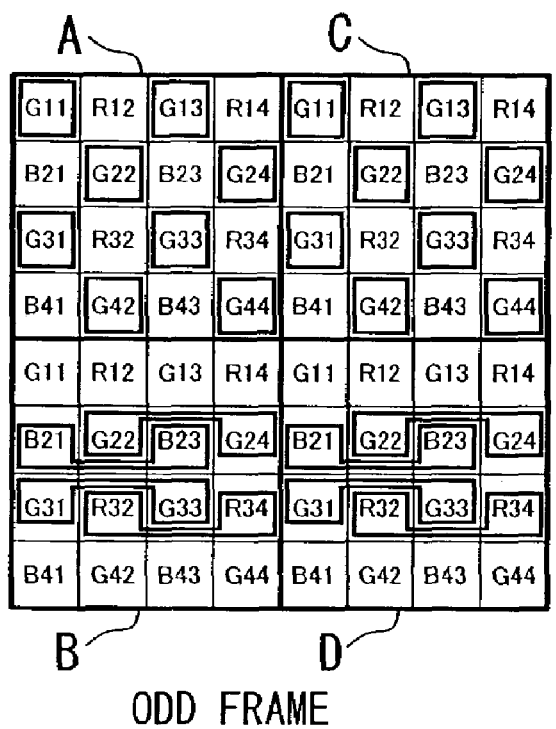
FIGS. 20A and 20B show the manner of reading all G pixels within division block in the sampling method shown in FIGS. 19A and 19B.
Figure 20B:
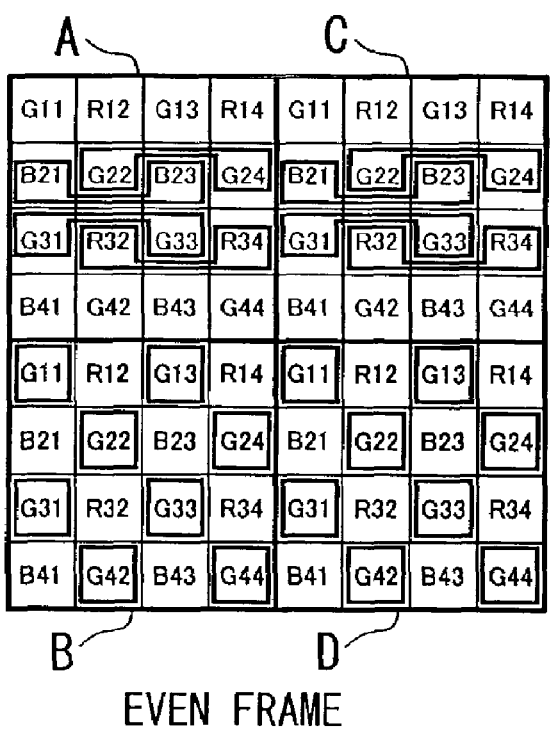

Further, as a modification of this embodiment, it is also possible that G signals for generating Y signal for use in Y/C separation/composition are formed by reading all G pixels within the division block as shown in FIGS. 20A, 20B. At this time, since two G pixels of each line can be simultaneously read out to be averaged, the readout is possible by the same clock number as the sampling pattern shown in FIGS. 19A. 19B. In particular, of A, C blocks of ODD frame of FIG. 20A, since readout by four clocks, i.e. (1) average value of G11, G13, (2) average value of G22, G24, (3) average value of G31, G33, and (4) average value of G42, G44, is possible, the number of clock thereof becomes the same as the intermittent read of FIGS. 19A, 19B. However, since the number of lines to be horizontally thinned out is different, the read speed of the whole is not the same.

Figure 21:
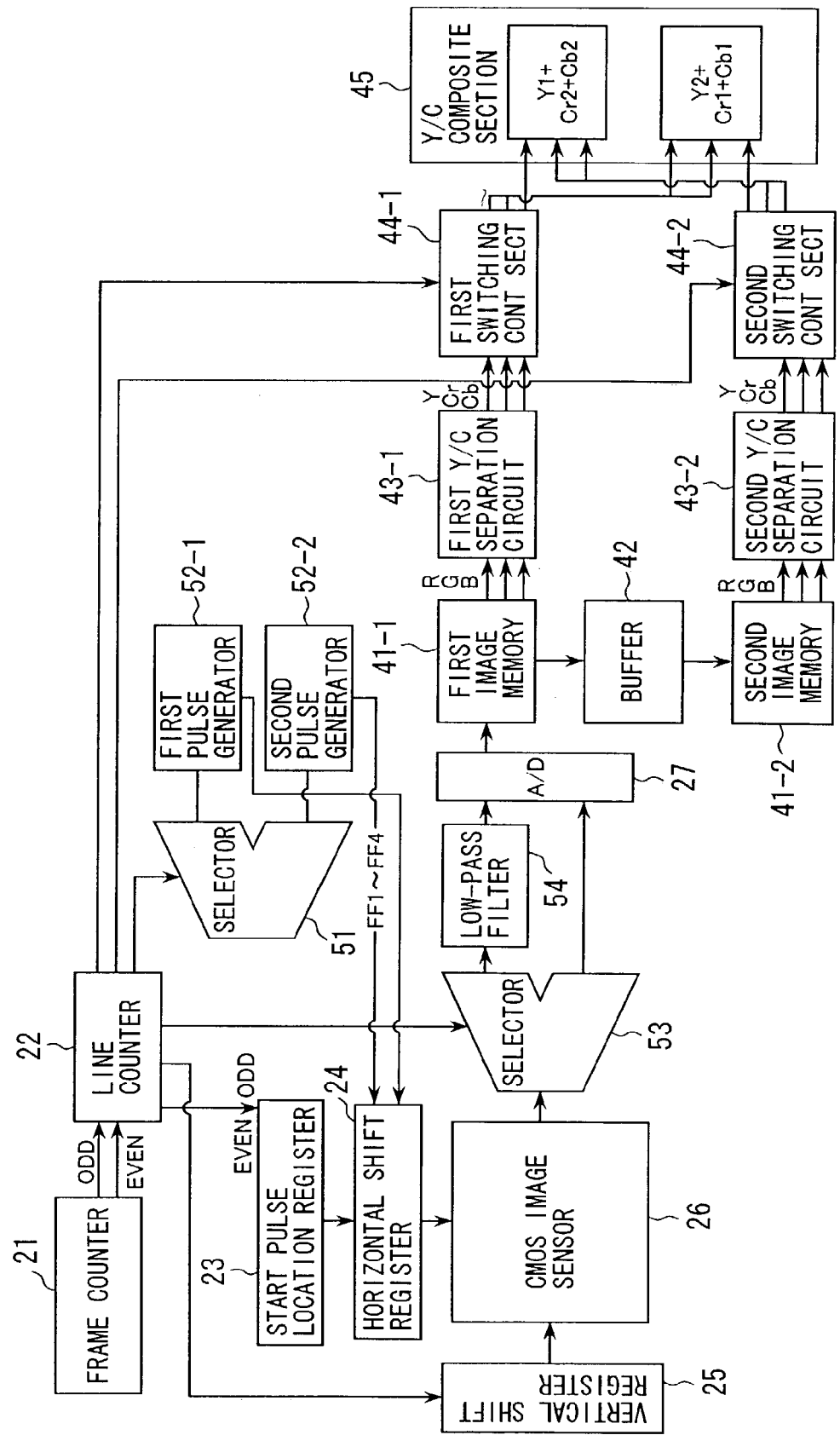
FIG. 21 is a block diagram showing a specific construction of the third embodiment.

FIG. 21 is a block diagram specifically showing a construction of the third embodiment for causing the operation as described above. In this embodiment, odd/evenness of frame is judged at the frame counter 21, and 8 residue system (example of FIGS. 19A, 19B) is recognized at the line counter 22. From these results, a selector 51 is operated in the case of a line requiring sampling to select one or the other of the operation pulses of two, i.e. a first and second pulse generators 52-1, 52-2. In ODD frame of FIG. 19A, the sampling of G channel is performed at lines 8n+2, 8n+3, and an averaging sampling is performed at lines 8n+6, 8n+7. The shift register operation pulse sequence of the sampling of thinning out every other pixel (FIG. 4B) is selected at lines 8n+2, 8n+3, and the shift register operation sequence of averaging sampling (FIG. 15) is selected at lines 8n+6, 8n+7. Further, while the start pulse location is different at lines 8n+2, 8n+3, this is read out from the start pulse location register 23.

When data of CMOS sensor elements 26 of each line has been read, selection is made at a selector 53 as to whether or not to perform low-pass filtering, since the low-pass filtering is required on the result of sampling of G channel. Thereafter, composition is performed by selecting the signals of G channel passed through low-pass filter 54. For example in FIG. 19A, line 2 column 2 (G22), line 3 column 3 (G33) of block A are sampled and averaged. It should be noted that the selection and processing of G channels is not limited to the example shown in FIGS. 19A, 19B and modifications thereof for example include an averaging sampling such as addition of adjacent two channels (G11+ G13). The selection and composition between different frames of Y signal based on G signals thus reduced of luminance moire and Cb, Cr signals are similar to the description of the second embodiment shown in FIG. 17.

In this manner, a movie having less luminance moire and color moire can be provided by causing the sampling rule (pattern) to be different line by line, by causing the phase and band of sampling to be different by locations within the same one frame, by causing the sampling phase and band for the same location to be different also between consecutive frames, and by combining a composition of Y signal using G signals processed of luminance moire reduction and Cb, Cr signals after performing the color moire reduction processing by the averaging sampling.

Fourth Embodiment

In the case of using a technique as in the above third embodiment where an interpolation is performed between frames by alternately sampling the read patterns for obtaining luminescence signal (Gch) and for obtaining chroma signals (R-G, B-G) between frames, an afterimage might be caused when the motion of object is relatively large. In a fourth embodiment, thus, switching between inter-frame interpolation and intra-frame interpolation is performed in accordance with the results of differential operation of luminescence signals between consecutive frames.

Figures 22A, 22B, 22C, 22D:
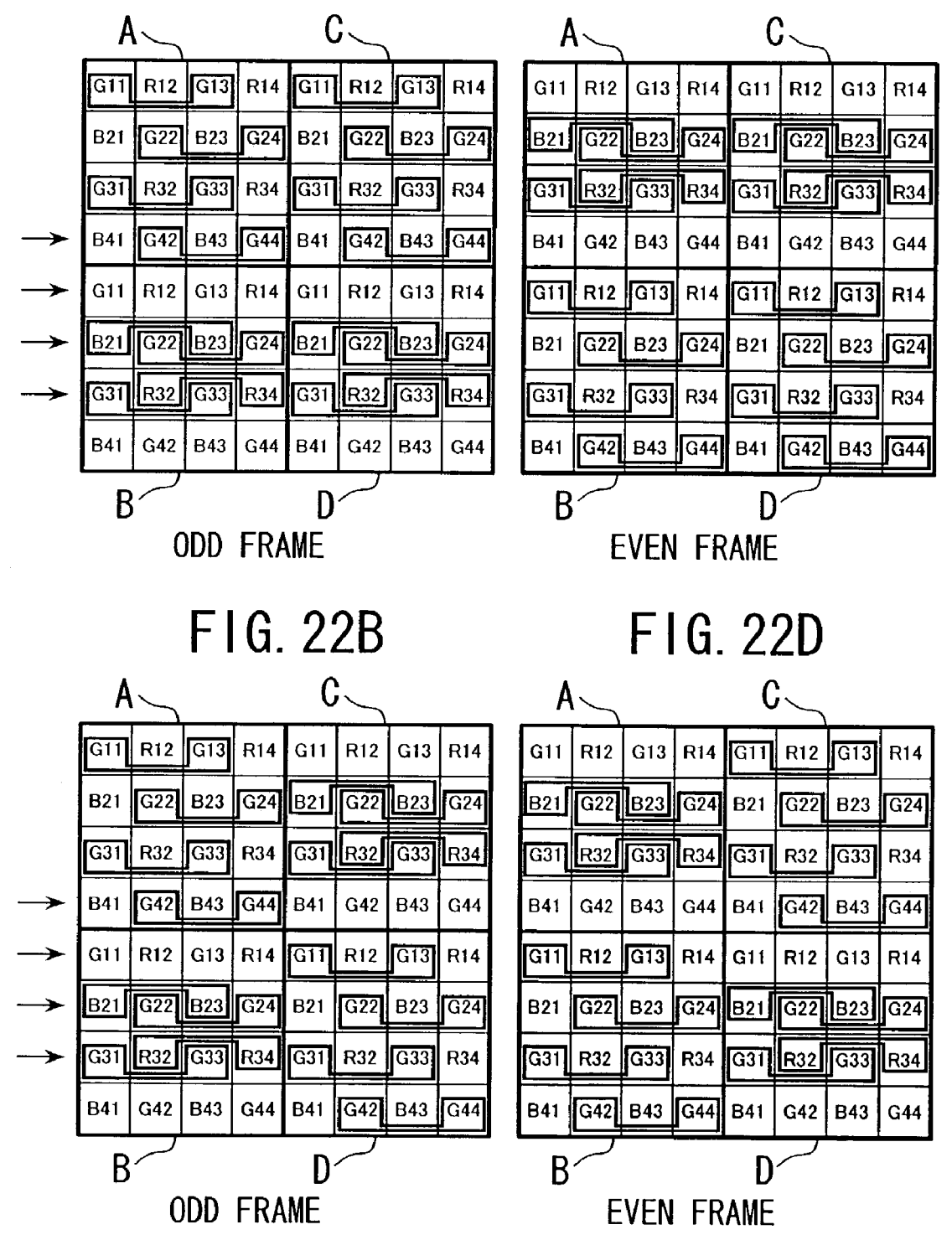

A description will be first given in detail with respect to the sampling in Y/C separation/composite processing by consecutive frames in the fourth embodiment. Shown in FIGS. 22A to 22D is an example of performing the sampling for obtaining luminescence signal (G) and chroma signals (R, G, B) for each of 4×4-pixel basic blocks. FIGS. 22A, 22C show an example of performing shift of sampling in the horizontal direction. In blocks A, C of FIG. 22A, sampling is performed four times by 2-pixel averaging with respect to G signals (sampling of luminance information). In blocks B, D, on the other hand, the sampling is performed once, twice, once for R, G, B signals, respectively, i.e. a total of four times by 2-pixel averaging (sampling of color information). FIG. 22C shows the sampling rule (pattern) in EVEN frame which comes next to ODD frame shown in FIG. 22A. Blocks A, C and blocks B, D thereof are of an inverse sampling pattern, respectively, of the ODD frame shown in FIG. 22A. Further, FIGS. 22B, 22D show an example where the sampling rule (pattern) is modulated in the horizontal and vertical directions.

The information of such sampling is stored as data (average value of two pixels in this case) corresponding to one clock. For the blocks of which all the channels of R, G, B are sampled, the chroma signals of R-G, B-G are computed and stored. By noticing each one block, therefore, the temporarily stored data are: one chroma data for each of R-G, B-G, and two Gch data (corresponding to upper and lower two lines) in I-th frame; four Gch data in I+1-th frame; one chroma data for each of R-G, B-G, and two Gch data (corresponding to upper and lower two lines) in I+2-th frame; etc. Further, in the blocks adjacent to the noticed block in the vertical direction, there are: four Gch data in I-th frame; one chroma data for each of R-G, B-G, and two Gch data (corresponding to upper and lower two lines) in I+1-th frame; four Gch data in I+2-th frame; etc.

For those blocks where Gch data are sampled four times in one block, chroma data of R-G, B-G are generated by means of interpolation from the preceding and subsequent frames and data of R, B are generated from the data of G channel and the chroma data without performing an inter-frame and inter-line interpolation of G channel.

Figure 23:
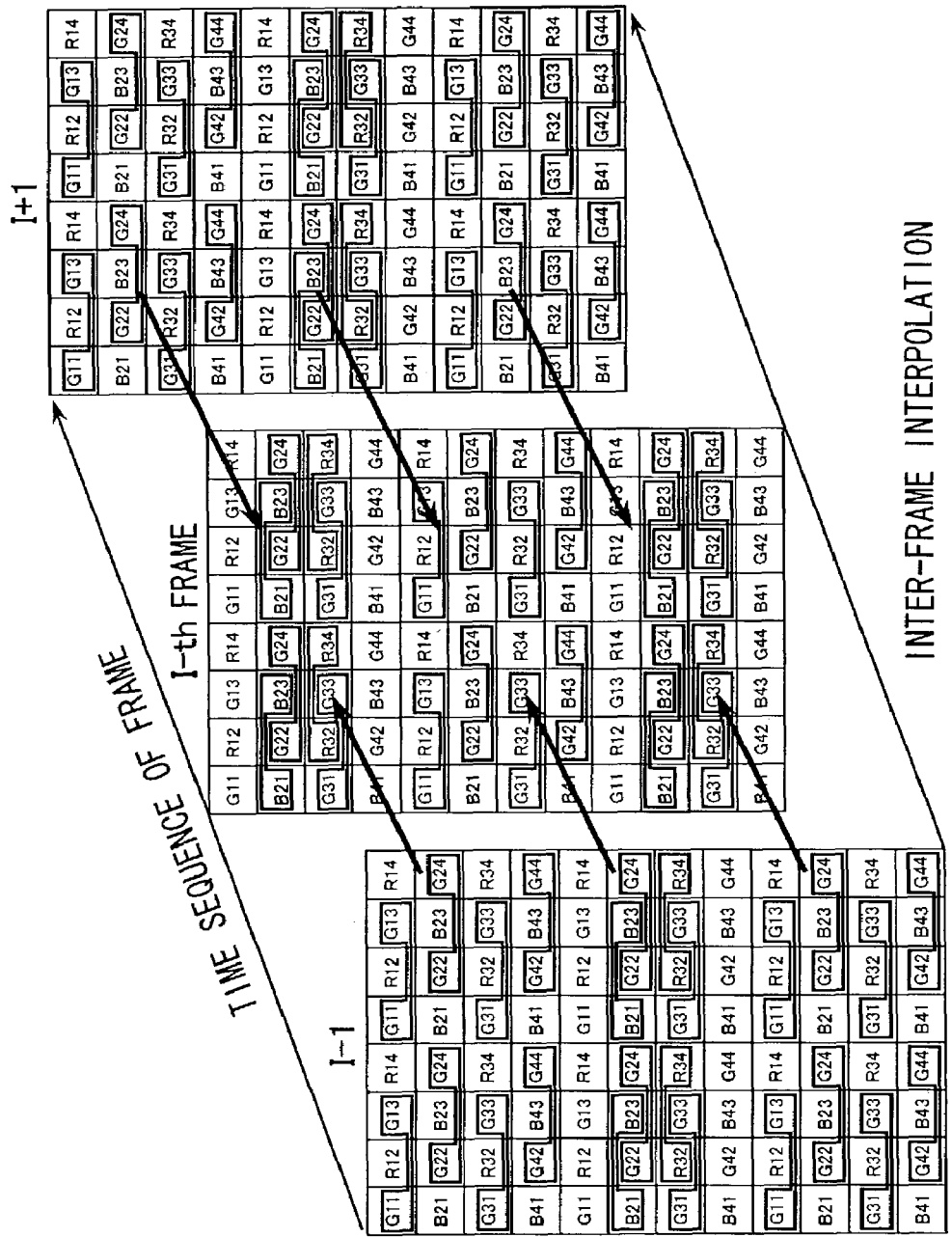
FIG. 23 shows the manner of inter-frame interpolation in the sampling method of Y/C separation/composition shown in FIG. 21.

For those blocks where two Gch data and chroma data are sampled in one block, on the other hand, it is determined by the magnitude of difference of luminescence signal of image between frames whether an interpolation of Gch data is to be performed within frame or to be performed between frames. For frame interpolation, of the example of images of three consecutive frames as shown in FIG. 23, a linear sum of G channel data $G_{i-1}$, $G_{i+1}$ at the same block location of the preceding and subsequent frames (I−1, I+1) and data $G_i$ of I frame is computed from formula (1) to form G channel data.

$$a \times G_i + b \times (G_{i-1} + G_{i+1}) \qquad (1)$$

Data of R, B are formed by using such linear sum (G channel data) and the chroma data sampled in I frame.

Figure 24:
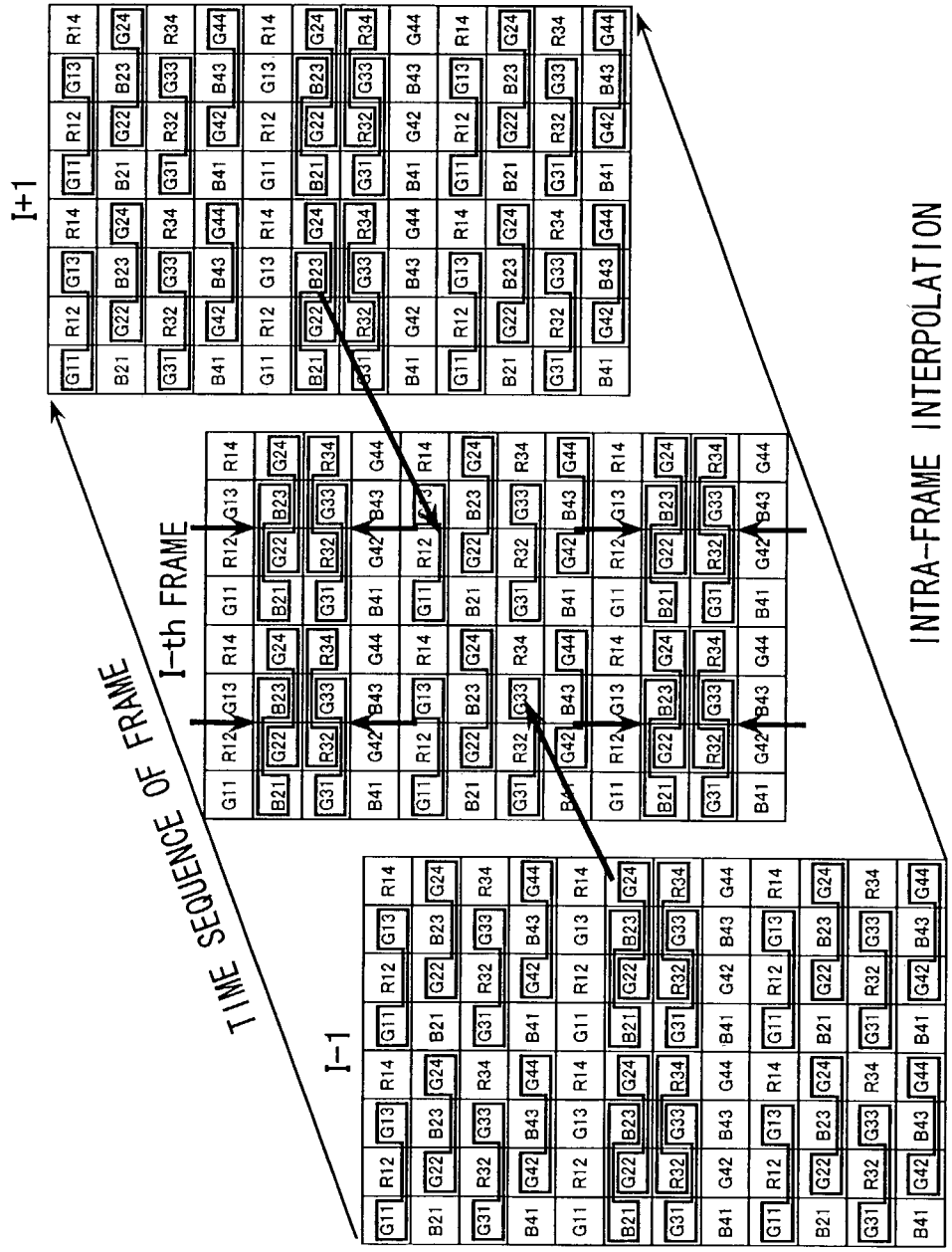
FIG. 24 shows the manner of intra-frame interpolation in the sampling method of Y/C separation/composition shown in FIG. 21.

In the case where motion of image is large so that the difference of luminance between frames is large, thus, an interpolation of luminescence signal between frames is not performed, and, as shown in FIG. 24, an interpolation of luminescence signal is performed within a frame. In particular, a linear sum of G data of the lower and upper ends of the upper and lower blocks, respectively, and G data sampled in the pertinent block is computed by the following formula (2).

$$a \times G_k + b \times (G_{k-1} + G_{k+1}) \qquad (2)$$

where: $G_k$ is average value of Gch data of four pixels sampled within one block; $G_{k-1}$ represents Gch data of the lower end of the block one above; $G_{K+1}$ represents Gch data of the upper end of the block one below.

Figure 25:
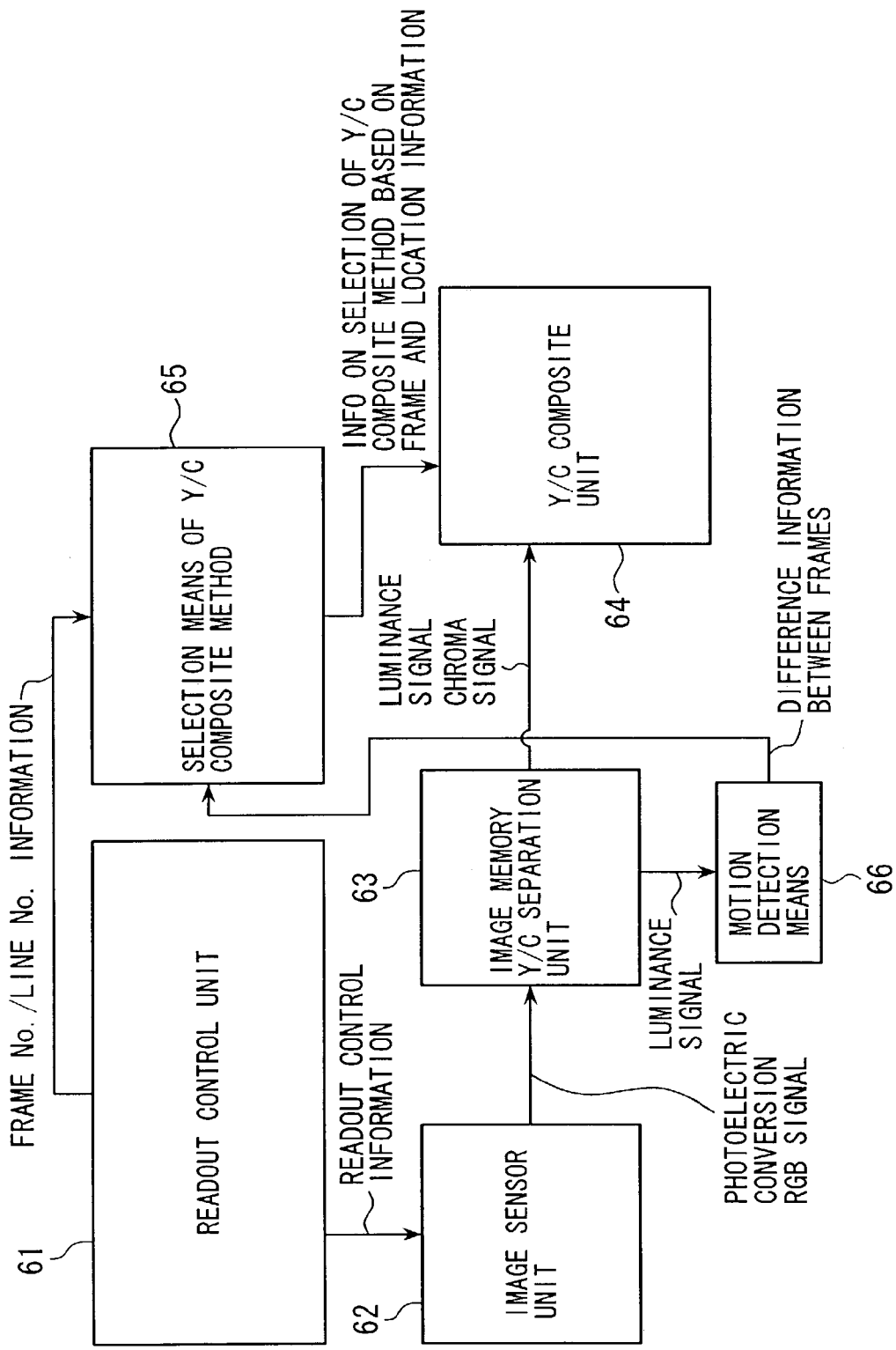
FIG. 25 is a block diagram schematically showing an imaging apparatus according to a fourth embodiment of the invention.

A description will now be given by way of a block diagram of FIG. 25 with respect to a general construction of the fourth embodiment for causing the above described operation. As shown in FIG. 25, the imaging apparatus according to the fourth embodiment includes: a readout control unit 61; image sensor unit 62; image memory Y/C separation unit 63; Y/C composite unit 64; Y/C composite method selection means 65; and motion detection means 66.

A description will now be given with respect to outlines of the operation of the imaging apparatus having the above described construction. First, the readout control unit 61 furnishes the image sensor unit 62 with read control information. The image sensor unit 62 provides RGB signals photoelectrically converted according to the read rule to an image memory of the image memory Y/C separation unit 63. At the image memory Y/C separation unit 63, Y/C separation (luminescence signal, chroma signal) is performed by computing G signal and chroma signals R-G, B-G from the RGB signals that are the contents of the image memory to output the luminescence signal and chroma signals. The Y/C composite unit 64, after receiving the luminescence signal and chroma signals from the image memory Y/C separation unit 63, performs composition of Y/C again to generate RGB signals. The method of Y/C composition at the Y/C composite unit 64 is selected by the Y/C composite method selection means 65. The selection means 65 selects the method of Y/C composition by referring to the magnitude of difference between frames outputted from the motion detection means 66 to which the information of frame number of image and line number from the readout control unit 61 and the luminescence signals from the image memory Y/C separation unit 63 are input.

Figure 26:
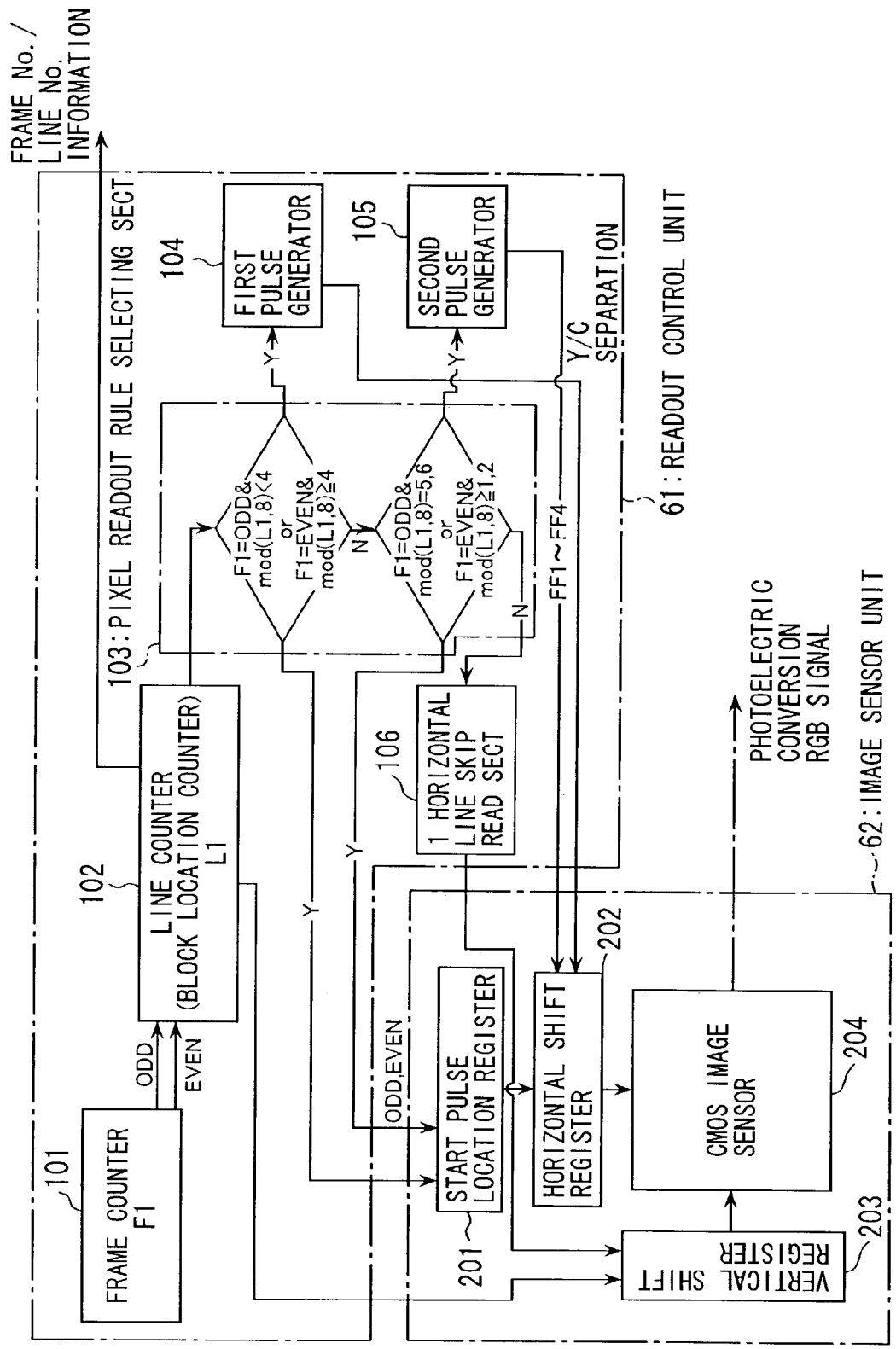
FIG. 26 is a block diagram showing detailed construction of the readout control unit and image sensor unit in the imaging apparatus shown in FIG. 25.

A description will now be given by way of FIG. 26 with respect to detailed construction of the readout control unit 61 and image sensor unit 62 shown in FIG. 25. The readout control unit 61 includes: a frame counter 101; line counter 102; pixel readout rule selecting section 103; first and second pulse generators 104, 105; and a horizontal single line skip read unit 106. The image sensor unit 62 includes: a start pulse location register 201; horizontal shift register 202; vertical shift register 203; and CMOS sensor 204.

A description will now be given with respect to operation of the readout control unit 61 and image sensor unit 62 of the above construction. The frame number and line location are detected by the frame counter 101 and line counter 102. In accordance with such values, selection is made as to: (1) the contents of the start pulse location register 201 for ruling the start location of sampling and the number of pixels to be simultaneously readout; and (2) the contents of the first and second pulse generators 104, 105 for ruling the operation of the horizontal shift register 202 for controlling the number of pixels to be skipped.

The decision of such selection is made in accordance with a criterion at the pixel readout rule selecting section 103. For example, in ODD frames of the case of readout by modulating frame by frame as shown in FIG. 22A, readout of G is performed in the lines containing blocks A, C and readout of RGB is performed at locations containing blocks B, D. In EVEN frames, this is reversed as shown in FIG. 22C. Here, the line numbers containing blocks A, C are 0, 1, 2, 3, in 8 residue system when the uppermost line number is 0 in the example shown in FIG. 22A. The line numbers containing blocks B, D are 4, 5, 6, 7, in 8 residue system. Accordingly, the conditions for performing readout of G are expressed by the following formula (3).

$$(F1 = ODD \text{ and } \mod(L1,8) < 4) \text{ or}$$

$$(F1 = EVEN \text{ and } \mod(L1,8) \geq 4) \qquad (3)$$

where F1 is frame number and L1 is line number. It should be noted that ODD/EVEN of frame number is for convenience and those frames consecutive in time are alternately considered as ODD/EVEN. Above mod(x,y) is a residue of x in modular y.

Further, the lines for performing readout of RGB at blocks B, D in ODD frame are expressed by the following formula (4).

$$\mod(L1,8) = 5,6 \qquad (4)$$

Also, the lines of RGB readout at blocks A, C in EVEN frame are expressed by the following formula (5).

$$\mod(L1,8) = 1,2 \qquad (5)$$

Accordingly, the conditions of frames and lines for performing RGB readout are as in the following formula (6).

$$(F1 = ODD \text{ and } \mod(L1,8) = 5 \text{ or } 6) \text{ or}$$

$$(F1 = EVEN \text{ and } \mod(L1,8) = 1 \text{ or } 2) \qquad (6)$$

Based on such judgment, the contents of the first and second pulse generators 104, 105 and the start pulse location register 201 are selected. For the conditions of line numbers other than these, shift pulse to the vertical shift register 203 is generated through the horizontal 1-line skip read section 106, since horizontal one line is not to be read. Under such driving conditions, the pixels of CMOS sensor 204 are read. The read out RGB signals are delivered to the image memory of the image memory Y/C separation unit 63.

Figure 27:
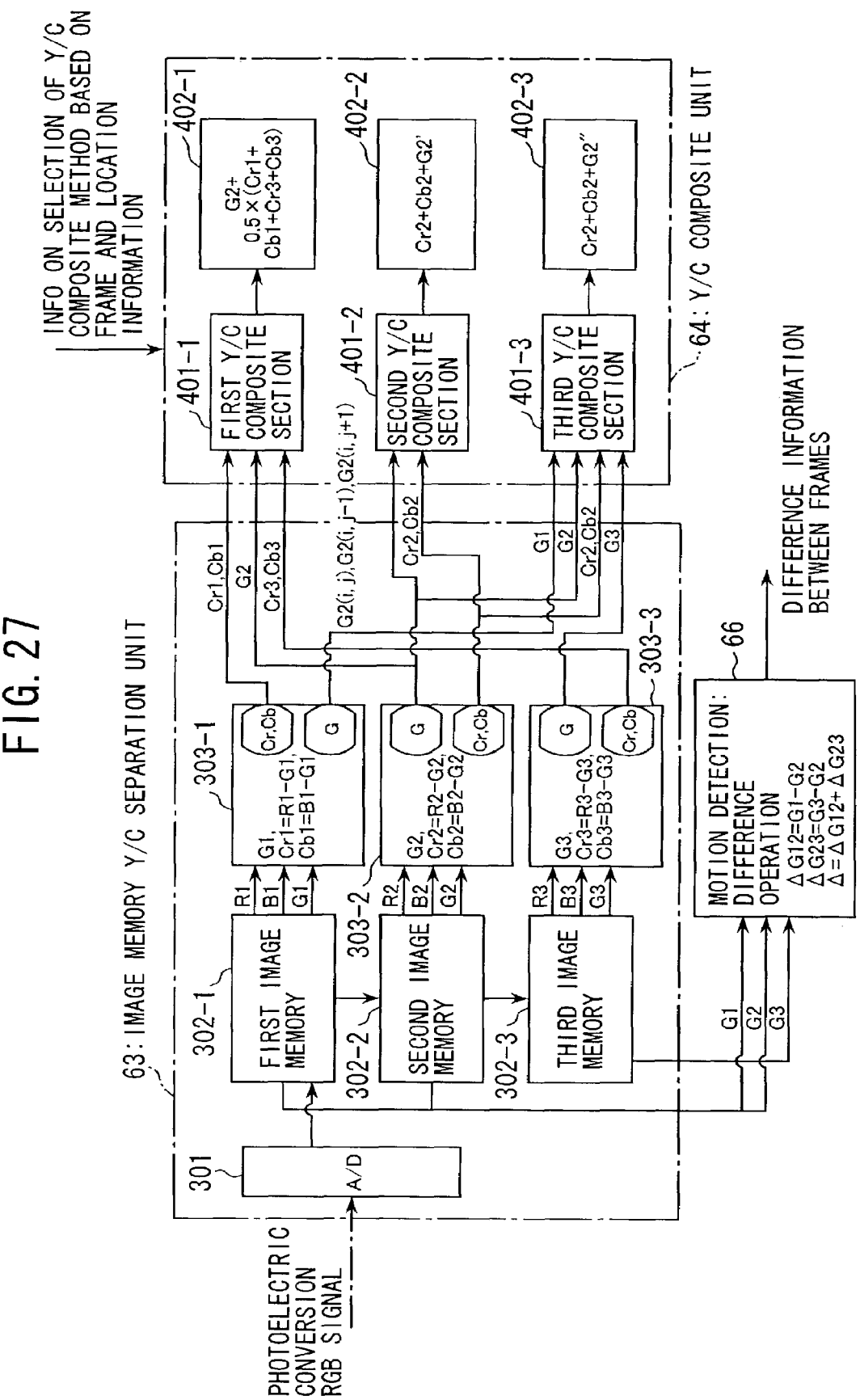
FIG. 27 is a block diagram showing detailed construction of the image memory Y/C separation unit, Y/C composite unit, and motion detection unit in the imaging apparatus shown in FIG. 25.

A description will now be given by way of FIG. 27 with respect to detailed construction of the image memory Y/C separation unit 63, Y/C composite unit 64, and motion detection means 66 shown in FIG. 25. Of the signals from the image sensor unit 62, after digitization at A/D converter 301 of the image memory Y/C separation unit 63, those image data of movies consecutive in time corresponding to three image frames are retained at three, i.e. first to third image memories 302-1, 302-2, 302-3. The signals corresponding to three frames retained at these image memories are used in computation of difference of luminance between frames for the detection of motion and in the interpolation of RGB signals.

At the first to third Y/C separation means 303-1, 303-2, 303-3, G signal and chroma signals R-G, B-G are computed from the RGB signals input from the respective image memories 302-1, 302-2, 302-3. Here, if only G signals are sampled by unit of 4×4 block as shown in block A of FIG. 22A, the G signal of the block is computed. In the case where the sampling of all colors of RGB is performed for example at the location of block B, on the other hand, chroma signals are computed. Though it is not shown, an information of pixel location must be used in the block-by-block separation.

At the motion detection means 66, an inter-frame difference is computed of the G signals of the three image frames retained at the three image memories 302-1, 302-2, 302-3. In the example shown in FIG. 27, since those subject to the computation of interpolation are the signals retained at the second image memory 302-2, the computation of difference is expressed by the following formulas (7), (8).

$$\Delta G12 = abs(G1-G2) \quad (7)$$

$$\Delta G23 = abs(G3-G2) \quad (8)$$

where "abs" indicates an absolute value, and "G1" for example represents G signal of the first image memory 302-1.

It should be noted that computation of difference in the parentheses on the right-side of the above (7), (8) is an integrating result over the entire frame region of the difference at the same location of the respective frames.

An interpolation of luminescence signal and chroma signals at the subject block is performed by a first to third Y/C composite sections 401-1, 401-2, 401-3 of the Y/C synthesis unit 64. Here, in the case such as of block A of FIG. 22A where the sampling only of G signals is performed at the subject block, an information of chroma signals is absent and thus is interpolated. In those blocks such as block B of FIG. 22A where the sampling of all colors is performed to compute chroma signals, an interpolation of luminescence signal is performed. At this time, the interpolation method for interpolating luminescence signal is switched according to motion between frames as shown in FIGS. 23, 24.

Figure 28:
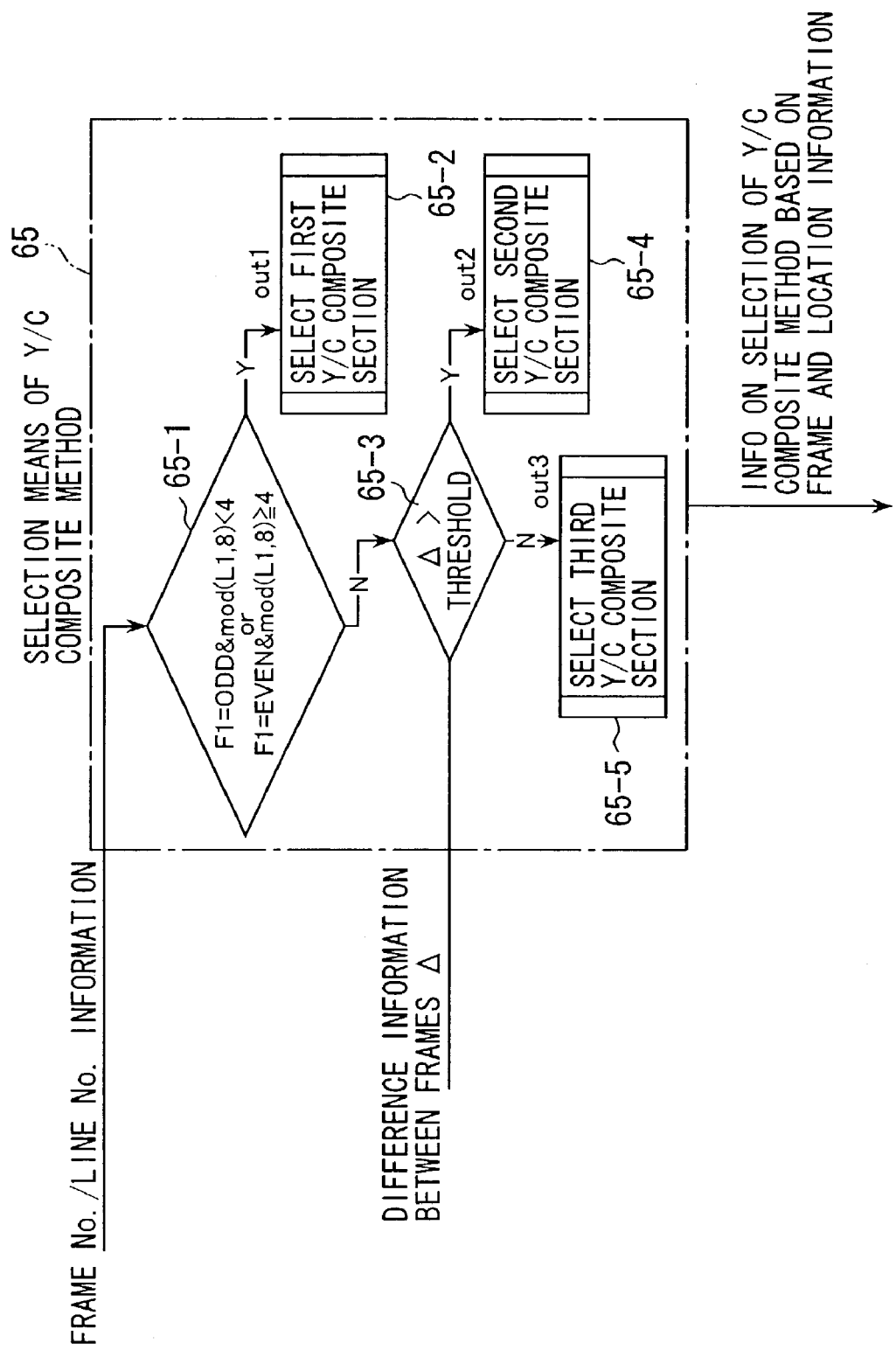
FIG. 28 is a flowchart showing detailed construction of the selection means of Y/C composite method in the imaging apparatus shown in FIG. 25.

While the criteria for selecting the signals to be interpolated and the means of interpolation as described above are set at the Y/C composite method selection means 65 shown in FIG. 25, an example of detailed construction thereof is shown in FIG. 28. At the composite method selection means 65, a decision criterion is computed by using an information of frame number and line number from the readout control unit 61. In particular, of those lines containing blocks A, C in ODD frame of FIG. 22A and those lines containing blocks B, D in EVEN frame of FIG. 22C, the decision criterion becomes as shown in step 65-1 of FIG. 28, i.e. the conditions shown in the following formula (9).

$$(F1=\text{ODD and mod}(L1,8)<4) \text{ or}$$

$$(F1=\text{EVEN and mod}(L1,8)\geq 4) \quad (9)$$

Accordingly, if the conditions indicated by the above formula (9) are met (Y), the first Y/C composite section 401-1 is selected, since an interpolation of chroma signals is performed from the frames that are adjacent thereto in time (step 65-2: out 1). In this case, as shown at the first Y/C composite section 401-1, the chroma signals of the first image memory 302-1 shown in the following formula (10) and the chroma signals of the third image memory 302-3 shown in the following formula (11) are selected as the original signals for generating chroma signal.

$$Cr1=R1-G1, \; Cb1=B1-G1 \quad (10)$$

$$Cr3=R3-G3, \; Cb3=B3-G3 \quad (11)$$

From an average of these, then, the composite chroma signals shown in the following formula (12) are generated.

$$Cr2=0.5\times(Cr1+Cr3), \; Cb2=0.5\times(Cb1+Cb3) \quad (12)$$

Further, G signal G2 of the second image memory 302-2 is used as the luminance information. The result of Y/C composition is as shown at the first composite output section 402-1.

On the other hand, if the sampling of all colors is performed and an interpolation of luminescence signal is required for example at blocks B, D of ODD frame in FIG. 22A and at blocks A, C of EVEN frame in FIG. 22C, the conditional branching at step 65-3 is performed as to whether to perform an inter-frame interpolation or to perform an intra-frame interpolation as described above according to the magnitude of difference of G signals of the respective frames.

In particular, if difference information Δ between the frames computed at the motion detection means 66 exceeds a predetermined threshold, the second Y/C composite section 401-2 is selected because an interpolation within a frame is to be performed (step 65-4: out 2). In this case, as shown in FIG. 24, G signals of the lower and upper ends respectively of the blocks above and below the subject block are used to generate G2'. If the location of the subject block is h=i, v=j, G2(i,j)' is computed by a linear sum shown in the following formula (13).

$$G2(i,j)'=a\times G2(i,j)+b\times[G2(i,j-1)+G2(i,j+1)] \quad (13)$$

If, on the other hand, difference Δ between the frames is smaller than the threshold at step 65-3 of the selection means 65 of Y/C composite method, the third Y/C composite section 401-3 is selected because an interpolation between frames is to be performed (step 65-5: out 3). In this case, the G signal, i.e. G2(i,j)" is computed by a linear sum shown in the following formula (14) same as equation (1).

$$G2(i,j)''=a\times G2(i,j)+b\times[G1(i,j-1)+G3(i,j+1)] \quad (14)$$

By performing switching of interpolation in this manner, it is possible to reduce after-image resulting from the object's motion and, in still images, to obtain a high-definition image.

As has been described by way of the above embodiments, it is possible according to the first aspect of the invention to reduce moire even when a size-reduced image is read out at a relatively high frame rate from a high-resolution image sensor array, since the readout pixel locations are caused to be different between frames. Further, in performing correlation operation between frames, since more information can be obtained by varying the readout pixel locations, it becomes possible to mutually interpolate information between frames when the sampling pixel number in one frame is limited by pixel clock and frame rate. According to the second aspect, the sampling number can be reduced by the discrete arrangement of the plurality of readout pixel location regions from each other and lack of image information due to the reduced sampling number can be interpolated by varying the readout pixel locations frame by frame, and it is also possible to achieve a higher frame rate by reducing the sampling number. According to the third aspect: it is possible in readout of the image sensor array to reduce moire in specific direction, since location of the sampling is shifted in addition to the horizontal shift; and in addition phase of the moire can be shifted to make it even less conspicuous by changing the readout pixel locations frame by frame.

According to the fourth aspect of the invention, the shift amount resulting from the frame-by-frame change of the pixel location regions is compensated for by the filter means so that flicker of image can be reduced at the same time of also reducing color moire and luminance moire. According to the fifth aspect, since the readout pixel location regions each are formed into a parallelogram, moire in the horizontal direction thereof can be reduced as compared to the case of being formed into a rectangle. According to the sixth aspect, since the plurality of readout pixel location regions within an image frame can be changed region by region as a combination of parallelogram shape and rectangular shape, the cut-off frequency of sampling is made indistinct so that it becomes possible to reduce moire in specific direction.

According to the seventh aspect of the invention, the shape of the readout pixel location regions is formed into a combination of rectangle and parallelogram so as to reduce specific frequency and moire by varying band of sampling region by region, and in addition, since the shape of the regions is selectively switched frame by frame, moire of specific frequency and direction can be further reduced. According to the eighth aspect, the shape of the readout pixel location regions is formed into a combination of two types of parallelogram so that moire of specific frequency and direction can be reduced by varying band of sampling region by region, and the shape of the regions is selectively switched frame by frame so that moire of specific frequency and direction can be further reduced. According to the ninth aspect, band limitation can be effected by performing an averaging operation at the averaging means to reduce color moire and luminance moire, and, since sampling of a plurality of pixels can be performed by means of averaging by one clock, the speed thereof can be increased.

According to the tenth aspect of the invention, color moire can be reduced without reducing perceived resolution of image as a whole by computing chromatic component from the regions at which the averaging is performed and by computing luminance information from the regions at which the averaging is not performed, and in addition, it becomes possible to reduce moire at specific frequency by varying the sampling frequency and phase region by region. According to the eleventh aspect, since sampling mode is varied region by region and in addition the sampling modes are exchanged frame by frame, the frequency and phase of sampling can be varied to visually reduce color moire and luminance moire. According to the twelfth aspect, an image having less color moire and luminance moire can be generated by a limited sampling number by interpolating image information between frames, since luminescence signals from the intermittent readout signals and color signals from the averaged signals in consecutive frames are separately sampled and then composed. According to the thirteenth aspect, the difference detecting means of luminance information between frames is provided so that inter-frame interpolation can be stopped and switching be made to an intra-frame interpolation in those images having relatively small correlation between frames, thereby flicker of image can be reduced in the case where Y/C composition by consecutive frames is performed.

What is claimed is:

1. An imaging apparatus for outputting image signals by photoelectrically converting an image formed at an optical system by an image sensor array having a color filter array having several spectral transmittance disposed in front thereof, said imaging apparatus comprising:

mode setting means capable of setting at least one mode among an all-pixel read mode for effecting readout of all of the pixels of at least one horizontal line, an intermittent read mode for effecting readout in a thinned-out manner of pixels to be read out from at least one horizontal line, and an averaging read mode for effecting readout by averaging a plurality of pixels as the mode for reading out image signals from said image sensor array; and readout rule control means for controlling and determining pixel locations for reading out said image signals; wherein:

when the intermittent read mode and/or the averaging read mode have been set by said mode setting means, the readout pixel locations to be determined by said readout rule control means are caused to vary frame by frame in the image signals to be read out;

when the intermittent read mode is set by said mode setting means:

the readout pixel locations to be determined by said readout rule control means are composed of pixel locations within a plurality of predetermined regions each consisting of a plurality of adjoining pixels;

said plurality of regions are discrete from each other and are arranged in the horizontal and vertical directions of said image sensor array; and said readout rule control means changes and controls the respective locations of said plurality of regions frame by frame in the image signals to be readout;

wherein said readout pixel location regions are arranged in such a manner that said regions located next to each other in the vertical direction of said image sensor array are shifted horizontally with respect to each other; and said readout rule control means changes and controls the locations of said readout pixel location regions frame by frame.

2. An imaging apparatus for outputting image signals by photoelectrically converting an image formed at an optical system by an image sensor array having a color filter array having several spectral transmittance disposed in front thereof, said imaging apparatus comprising:

mode setting means capable of setting at least one mode among an all-pixel read mode for effecting readout of all of the pixels of at least one horizontal line, an intermittent read mode for effecting readout in a thinned-out manner of pixels to be read out from at least one horizontal line, and an averaging read mode for effecting readout by averaging a plurality of pixels as the mode for reading out image signals from said image sensor array;

readout rule control means for controlling and determining pixel locations for reading out said image signals; wherein:

when the intermittent read mode and/or the averaging read mode have been set by said mode setting means, the readout pixel locations to be determined by said readout rule control means are caused to vary frame by frame in the image signals to be read out;

when the intermittent read mode is set by said mode setting means:

the readout pixel locations to be determined by said readout rule control means are composed of pixel locations within a plurality of predetermined regions each consisting of a plurality of adjoining pixels;

said plurality of regions are discrete from each other and are arranged in the horizontal and vertical directions of said image sensor array; and said readout rule control means changes and controls the respective locations of said plurality of regions frame by frame in the image signals to be readout; and a filter means for performing filter operation processing of readout image signals to compensate for shift amount resulting from a frame-by-frame change of the locations of said readout pixel location regions.

3. An imaging apparatus for outputting image signals by photoelectrically converting an image formed at an optical system by an image sensor array having a color filter array having several spectral transmittance disposed in front thereof, said imaging apparatus comprising:

mode setting means capable of setting at least one mode among an all-pixel read mode for effecting readout of all of the pixels of at least one horizontal line, an intermittent read mode for effecting readout in a thinned-out manner of pixels to be read out from at least one horizontal line, and an averaging read mode for effecting readout by averaging a plurality of pixels as the mode for reading out image signals from said image sensor array; and readout rule control means for controlling and determining pixel locations for reading out said image signals; wherein:

when the intermittent read mode and/or the averaging read mode have been set by said mode setting means, the readout pixel locations to be determined by said readout rule control means are caused to vary frame by frame in the image signals to be read out;

when the intermittent read mode is set by said mode setting means:

the readout pixel locations to be determined by said readout rule control means are composed of pixel locations within a plurality of predetermined regions each consisting of a plurality of adjoining pixels;

said plurality of regions are discrete from each other and are arranged in the horizontal and vertical directions of said image sensor array; and said readout rule control means changes and controls the respective locations of said plurality of regions frame by frame in the image signals to be readout;

wherein said readout pixel location regions are each in a parallelogram shape where the locations of pixels in the vertical direction of the region are horizontally shifted with respect to each other.

4. An imaging apparatus for outputting image signals by photoelectrically converting an image formed at an optical system by an image sensor array having a color filter array having several spectral transmittance disposed in front thereof, said imaging apparatus comprising:

mode setting means capable of setting at least one mode among an all-pixel read mode for effecting readout of all of the pixels of at least one horizontal line, an intermittent read mode for effecting readout in a thinned-out manner of pixels to be read out from at least one horizontal line, and an averaging read mode for effecting readout by averaging a plurality of pixels as the mode for reading out image signals from said image sensor array; and readout rule control means for controlling and determining pixel locations for reading out said image signals; wherein:

when the intermittent read mode and/or the averaging read mode have been set by said mode setting means, the readout pixel locations to be determined by said readout rule control means are caused to vary frame by frame in the image signals to be read out;

when the intermittent read mode is set by said mode setting means:

the readout pixel locations to be determined by said readout rule control means are composed of pixel locations within a plurality of predetermined regions each consisting of a plurality of adjoining pixels;

said plurality of regions are discrete from each other and are arranged in the horizontal and vertical directions of said image sensor array; and said readout rule control means changes and controls the respective locations of said plurality of regions frame by frame in the image signals to be readout;

wherein said readout pixel location regions are a combination of parallelogram shape where the locations of pixels in the vertical direction of the region are horizontally shifted with respect to each other and rectangular shape where the locations of pixels in the vertical direction of said region are not shifted from each other.

5. The imaging apparatus according to claim 4, wherein said readout rule control means selectively switches the shape of said regions to said parallelogram shape or said rectangular shape in accordance with the location of the regions frame by frame in the image signals to be read out.

6. An imaging apparatus for outputting image signals by photoelectrically converting an image formed at an optical system by an image sensor array having a color filter array having several spectral transmittance disposed in front thereof, said imaging apparatus comprising:

mode setting means capable of setting at least one mode among an all-pixel read mode for effecting readout of all of the pixels of at least one horizontal line, an intermittent read mode for effecting readout in a thinned-out manner of pixels to be read out from at least one horizontal line, and an averaging read mode for effecting readout by averaging a plurality of pixels as the mode for reading out image signals from said image sensor array; and readout rule control means for controlling and determining pixel locations for reading out said image signals; wherein:

when the intermittent read mode and/or the averaging read mode have been set by said mode setting means, the readout pixel locations to be determined by said readout rule control means are caused to vary frame by frame in the image signals to be read out;
when the intermittent read mode is set by said mode setting means:
the readout pixel locations to be determined by said readout rule control means are composed of pixel locations within a plurality of predetermined regions each consisting of a plurality of adjoining pixels;
said plurality of regions are discrete from each other and are arranged in the horizontal and vertical directions of said image sensor array; and
said readout rule control means changes and controls the respective locations of said plurality of regions frame by frame in the image signals to be readout;
wherein said readout pixel location regions are formed of a combination of two types of parallelogram shape both having the locations of pixels in the vertical direction of the region that are horizontally shifted and each having a different inclination to the horizontal direction from the other; and said readout rule control means selectively and alternatively switches frame by frame in the image signals to be read out the shape of said regions to one or the other of the two types of parallelogram having different shape in accordance with the location of the regions.

7. An imaging apparatus for outputting image signals by photoelectrically converting an image formed at an optical system by an image sensor array having a color filter array having several spectral transmittance disposed in front thereof, said imaging apparatus comprising:
mode setting means capable of setting at least one mode among an all-pixel read mode for effecting readout of all of the pixels of at least one horizontal line, an intermittent read mode for effecting readout in a thinned-out manner of pixels to be read out from at least one horizontal line, and an averaging read mode for effecting readout by averaging a plurality of pixels as the mode for reading out image signals from said image sensor array;
readout rule control means for controlling and determining pixel locations for reading out said image signals, wherein when the intermittent read mode and/or the averaging read mode have been set by said mode setting means, the readout pixel locations to be determined by said readout rule control means are caused to vary frame by frame in the image signals to be read out; and
an averaging means for performing a predetermined averaging operation on readout image signals when the intermittent read mode has been set by said mode setting means.

8. The imaging apparatus according to claim 7, wherein those regions subjected to the averaging operation by said averaging means and those regions not subjected to the averaging operation are caused to alternately occur on the image sensor array.

9. The imaging apparatus according to claim 8, wherein the regions subjected to said averaging operation and the regions not subjected to the averaging operation are switched to each other frame by frame in the image signals to be read out.

10. An imagine apparatus for outputting image signals by photoelectrically converting an image formed at an optical system by an image sensor array having a color filter array having several spectral transmittance disposed in front thereof, said imagine apparatus comprising:
mode setting means capable of setting at least one mode among an all-pixel read mode for effecting readout of all of the pixels of at least one horizontal line, an intermittent read mode for effecting readout in a thinned-out manner of pixels to be read out from at least one horizontal line, and an averaging read mode for effecting readout by averaging a plurality of pixels as the mode for reading out image signals from said image sensor array;
readout rule control means for controlling and determining pixel locations for reading out said image signals, wherein when the intermittent read mode and/or the averaging read mode have been set by said mode setting means, the readout pixel locations to be determined by said readout rule control means are caused to vary frame by frame in the image signals to be read out; and
a means for extracting color signals from the signals obtained by averaging image signals corresponding to the same block location within consecutive frames read out at the time of said all-pixel read mode and extracting luminescence signals from the signals read out at the time of the intermittent read mode to generate consecutive image data by composing said respectively extracted color signals and luminescence signals.

11. The imaging apparatus according to claim 10 further comprising:
means for detecting difference of luminance information between frames of the image signals to be read out; and
means for switching the interpolating method of luminance information and chromatic component based on the difference between the frames detected at the difference detecting means.

12. An imaging apparatus for outputting image signals by photoelectrically converting an image formed at an optical system by an image sensor array having a color filter array having several spectral transmittance disposed in front thereof, said imaging apparatus comprising:
mode setting means capable of setting an all-pixel read mode for effecting readout of all of the pixels of at least one horizontal line, an intermittent read mode for effecting readout in a thinned-out manner of pixels to be read out from at least one horizontal line, and an averaging read mode for effecting readout by averaging a plurality of pixels as the mode for reading out image signals from said image sensor array; and
readout rule control means for controlling and determining pixel locations for reading out said image signals;
wherein when the intermittent read mode and the averaging read mode have been set by said mode setting means, the readout pixel locations to be determined by said readout rule control means are caused to vary frame by frame in the image signals to be read out.

* * * * *

UNITED STATES PATENT AND TRADEMARK OFFICE
CERTIFICATE OF CORRECTION

PATENT NO. : 7,242,432 B2
APPLICATION NO. : 10/440203
DATED : July 10, 2007
INVENTOR(S) : Nobuyuki Watanabe It is certified that error appears in the above-identified patent and that said Letters Patent is hereby corrected as shown below:

In Column 15, Line 41, delete "-in" and insert --in--.

In Column 28, Line 1, in Claim 10, delete "imagine" and insert --imaging--.

In Column 28, Line 5, in Claim 10, delete "imagine" and insert --imaging--.

Signed and Sealed this

Ninth Day of September, 2008

JON W. DUDAS
*Director of the United States Patent and Trademark Office*